United States Patent [19]

Hirota

[11] Patent Number: 5,357,353
[45] Date of Patent: Oct. 18, 1994

[54] IMAGE FORMING APPARATUS

[75] Inventor: Yoshihiko Hirota, Toyokawa, Japan

[73] Assignee: Minolta Camera Kabushiki Kaisha, Osaka, Japan

[21] Appl. No.: 883,523

[22] Filed: May 15, 1992

[30] Foreign Application Priority Data

| May 17, 1991 | [JP] | Japan | 3-113392 |
| May 20, 1991 | [JP] | Japan | 3-114678 |
| May 20, 1991 | [JP] | Japan | 3-114679 |
| May 20, 1991 | [JP] | Japan | 3-114680 |
| May 20, 1991 | [JP] | Japan | 3-114681 |
| May 20, 1991 | [JP] | Japan | 3-114682 |

[51] Int. Cl.$^5$ .............................. H04N 1/40
[52] U.S. Cl. .................. 358/530; 358/501; 358/518
[58] Field of Search ........... 358/400, 401, 500, 501, 358/518, 520, 521, 523, 530, 533, 537, 538, 443, 447, 448, 452, 458, 462, 468; 355/218, 246, 266, 326 R, 327

[56] References Cited

U.S. PATENT DOCUMENTS

| 4,809,063 | 2/1989 | Moriguchi et al. | 358/75 |
| 4,845,550 | 7/1989 | Urabe et al. | 358/80 |
| 4,878,125 | 10/1989 | Katayama et al. | 358/443 |
| 4,908,712 | 3/1990 | Uchiyama et al. | 358/298 |
| 4,989,079 | 1/1991 | Ito | 358/80 |
| 4,992,863 | 2/1991 | Moriya | 358/80 |
| 5,032,903 | 7/1991 | Suzuki et al. | 358/75 |
| 5,047,844 | 9/1991 | Ikeda et al. | |
| 5,075,770 | 12/1991 | Smyth | 358/80 |
| 5,132,788 | 7/1992 | Hirota | |
| 5,144,688 | 9/1992 | Bovir et al. | 382/56 |
| 5,148,809 | 9/1992 | Biegelseisen-Knight et al. | 128/660.07 |
| 5,231,677 | 7/1993 | Mita et al. | 382/22 |
| 5,257,116 | 10/1993 | Suzuki | 358/465 |
| 5,311,328 | 5/1994 | Murata | 358/447 |

FOREIGN PATENT DOCUMENTS

| 52-23208 | 2/1977 | Japan . |
| 61-13262 | 1/1986 | Japan . |
| 63-185163 | 7/1988 | Japan . |

Primary Examiner—Bentsu Ro
Attorney, Agent, or Firm—Burns, Doane, Swecker & Mathis

[57] ABSTRACT

The characteristics such as hue, saturation, edge portion or flat portion of image data are decided for each pixel based on read data of three primary colors. The decision is performed on the data which have been subjected to spatial filtering, and the processing of the image data such as smoothing or edge emphasis are changed according to the detected characteristics. For example, the masking coefficient is selected according to the detected hue. The color data is decreased and the black data is generated, according to the detected saturation. The edge is decided only when the sign of the gradients of the three color data agree with each other. Further, edge detection quantity is detected in the edge decision and the edge emphasis or the smoothing is performed by comparing the edge detection quantity with threshold values only when the edge is detected.

27 Claims, 21 Drawing Sheets

IMAGE FORMING APPARATUS

BACKGROUND OF THE INVENTION

1. Field of the Invention

The present invention relates to an image forming apparatus such as a copying machine or a printer which forms a multi-color image.

2. Description of Related Art

In a printer or the like for reproducing a full-color image, digital image data R, G, B of red, green and blue of primary colors obtained by reading a document are transformed to data C, M, Y of the complementary colors of cyan, magenta and yellow used for image reproduction.

Therefore, data processing is performed in order to transform the digital data of the three colors, red, green and blue, to data for the three colors for image reproduction.

As to the data processing for a full-color image, following three points have to be taken into consideration: (a) the compatibility of the visibility of black and the saturation of colors, (b) the improvement of color reproducibility, and (c) the compatibility of resolution and smoothness.

As to the first point (a) of the reproduction of black in a full-color image, pure black is hardly reproduced by overlapping cyan, magenta and yellow toners due to the spectral characteristics of the toners. Then, the reproducibility of black is improved by using subtractive mixture of the reproduction colors, cyan, magenta and yellow, and by using black paint. However, in this method, the visibility of black is improved by increasing the degree of black paint, while the saturations of chromatic colors are lowered. For a full-color image, the improvement of the pureness of achromatic colors has to be compatible with the improvement of the saturation of chromatic colors.

Then, the black paint may be proposed to be performed according to the decision of achromatic color or chromatic color. However, the decision with use of the read colors of red, green and blue is liable to err due for example to Moire patterns for a dot document and to errors and noises in a document of flat density and in portions where the hue and the brightness change gradually. Especially, the decision at an edge portion in a image or at a portion where the brightness varies much is liable to be erroneous due to the color, shift of print location or the like, so that the black paint may deteriorate the image adversely. Further, in an image of low saturation, the decision of achromatic color and that of chromatic color may alternate rapidly. Then, because the black paint is performed only for pixels decided to be achromatic colors, the resultant image seems to include random noises.

As to the second point (b), the color reproducibility is affected by the masking correction which is performed to compensate the discrepancies of the characteristics of the filters and of the toners from the ideal characteristics.

The masking correction is usually performed by using linear masking coefficients which are determined in order to minimize the average color differences over the whole color reproduction region. However, the color difference between the original color and the reproduced color is not necessarily minimized in some parts in the color reproduction region and the errors in color reproduction and in gradation may become larger. Then, it is said the secondary masking processing including secondary terms such as $DR_2$, $DG_2$, $DB_2$, $DR \cdot DG$, $DG \cdot DB$ and $DB \cdot DR$ is better. However, this needs a complicated and larger circuit.

In order to solve this problem, a color image read apparatus disclosed in Japanese patent laid open Publication No. 16,875/1990 has a plurality of masking coefficients each for an important color besides a masking coefficient for an image ordinary as to hues and when a user specifies a hue, the masking coefficient of the hue can be used. However, it is troublesome for a user to specify a hue. Sometimes, a user may specify an erroneous hue. Further, it is not necessarily natural that portions of different characters are intermingled in an image.

As to the third point (c), it is better to change a data processing technique according to the characteristics of an image. Edges have to be emphasized for images such as characters and narrow lines, while half-tone images such as photographs have to be smoothed. Selective control between edge emphasis and smoothing has been carried out in some prior arts by detecting an edge for an input image data in order to discriminate a character/photograph portion for a monochromatic image. For example, the density of the center pixels and its density gradient are obtained at least in the two directions and contrast is emphasized.

However, simple edge emphasis is not necessarily performed well for a full-color image because the image density changes according to the hue and the saturation. For example, when color changes from white to red, edge emphasis may be performed, while when color changes from red to cyan, edge emphasis has not to be performed because the hue changes anomalously at an edge as in color ghost phenomenon. An image of human facial skin is especially affected by the processing according to region discrimination.

In a method disclosed in Japanese Patent laid open Publication No. 171,067/1988, the gradient and the gradient direction of an edge are detected for a center pixel for each read color or for each reproduction color in a color image, and the data of the read color or the reproduction color is corrected according to the detection. However, in this method, because the correction is performed for each color, the edge emphasis is performed even for a hue change. Thus, the hue in an image does not necessarily change naturally.

It has been considered that the image reproducibility may be enhanced if the data processing technique is changed according the characteristics of full-color image. For example, regions for character images and those for half-tone images are designated and the data processing is changed appropriate for each region. In this method, a user has to designates the regions. Further, it is troublesome for a user to designate the characteristics of an image in detail. The discrimination of a specified color is used for example for a color change function provided in a printer to change the specified color to another color. In order to prevent the error of the color discrimination of the specified color, for example a mask processing with use of majority decision for decision results is tried. However, the improvement of the color discrimination is only a little.

SUMMARY OF THE INVENTION

It is an object of the present invention to provide an image forming apparatus wherein the reproducibility of full-color image is improved.

It is another object of the present invention to provide an image forming apparatus wherein the pureness of achromatic colors and the saturation of chromatic colors can be improved simultaneously for a full-color image.

It is a further object of the present invention to provide an image forming apparatus wherein the deterioration of image at an edge portion can be prevented.

The characteristics such as hue, saturation, edge portion or flat portion of full-color image data are decided for each pixel based on read data of three primary colors. The decision is performed on the data which have been subjected to filtering, and the processing of the image data such as smoothing or edge emphasis are changed according to the detected characteristics. For example, a plurality of masking coefficients is stored in the memory and the masking coefficient is selected according to the detected hue. The color data is decreased from the color data and the black data is generated for improving the pureness of black, while the amounts of the decrease of the color data and of the generated black data are controlled according to the detected saturation. The edge is decided only when the direction of the gradients of the three color data agree with each other. Further, edge emphasis or the smoothing is performed by comparing the edge detection quantity with threshold values only when the edge is detected.

An advantage of the present invention is that errors in the decision of the characteristics of image can be reduced to improve the reproducibility of image by extracting the characteristics of image in a local region around a central pixel under processing.

Another advantage of the present invention is that the precision of region decision can be improved, especially for a color image, with use of filter processing of input data according to the purpose of the object of region decision, to improve color reproduction, the pureness of black, the sharpness of characters and narrow lines and the reduction of image noises.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
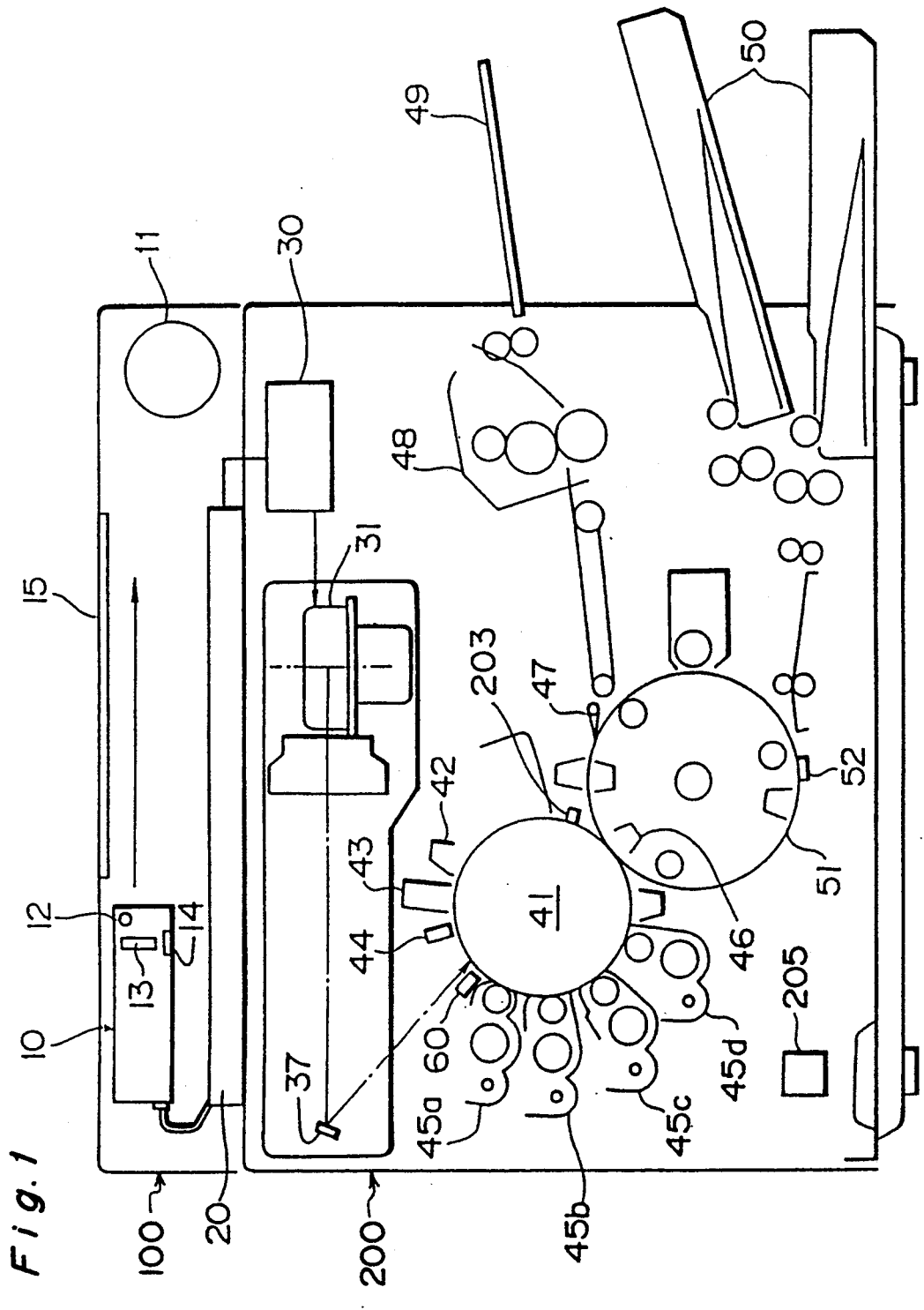
FIG. 1 is a sectional view of a full-color copying machine.

An embodiment of the present invention will be explained below in the following order:
- (a) structure of digital color copying machine
- (b) image data processing
    - (b-1) structure of image data processor
    - (b-2) region discrimination and outline of image data processing
- (c) density conversion
- (d) black generation
- (e) automatic control of under color remove/black painting in region discrimination (decision of achromatic/chromatic color)
    - (e-1) object of automatic control of under color remove/black painting
    - (e-2) smoothing
    - (e-3) decision of chromatic/achromatic color
- (f) automatic masking control in region discriminator (hue decision)
    - (f-1) object of automatic masking control
- (g) color correction
- (h) automatic control of edge emphasis/smoothing in region discriminator (edge decision)
    - (h-1) object of edge emphasis/smoothing
    - (h-2) edge detection
- (i) MTF correction (a) Structure of Digital Color Copying Machine Referring now to the drawings, wherein like reference characters designate like or corresponding parts throughout the views, FIG. 1 shows a schematic structure of a digital color copying machine which consists mainly of an image reader 100 for reading a document image and a main body 200 for reproducing the document image.

In FIG. 1, a scanner includes an exposure lamp 12, a rod lens array 13 to collect reflection light from a document put on a platen 15 and a contact type CCD color image sensor 14 to convert the collected light to an electric signal. The scanner 10 is driven by a motor 11 to move in the direction (subscan direction) of the arrow shown in FIG. 1. The optical image of the document illuminated by the exposure lamp 12 is converted by the image sensor 14 into a multi-level electric signal of red (R), green (G) and blue (B). The electric signal is converted by a read signal processor 20 to gradation data of yellow (Y), magenta (M), cyan (C) or black (K). Then, a print head 31 performs gamma correction of the gradation data and a dither processing if necessary, and it converts the corrected data to a digital drive signal to drive a laser diode 221 (not shown) in the print head 31.

A laser beam emitted from the laser diode 221 according to the gradation data exposes a photoconductor drum 41 driven to be rotated, via a reflection mirror 37 as shown with a dot and dash line. Thus, an image of the document is formed on the photoconductor of the drum 41. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of developers 45a–45b of yellow, magenta, cyan and black toners is selected to develop the latent image. The developed image is transferred by a transfer charger 46 to a paper wound on a transfer drum 51.

The above-mentioned printing process is repeated four times for yellow, magenta, cyan and black. At this time, the scanner 10 repeats the scanning in synchronization with the motion of the photoconductor drum 41 and the transfer drum 51. Then, the paper is isolated from the transfer drum 51 with the operation of an isolation claw 47, the image is fixed by a fixer 48 and the paper is carried out to a paper tray 49. In this process, a paper is supplied from a paper cassette 50 and is chucked at the top of the paper by a chucking mechanism 52 on the transfer drum 51 in order to prevent a shift of position on the image transfer.

Figure 2:
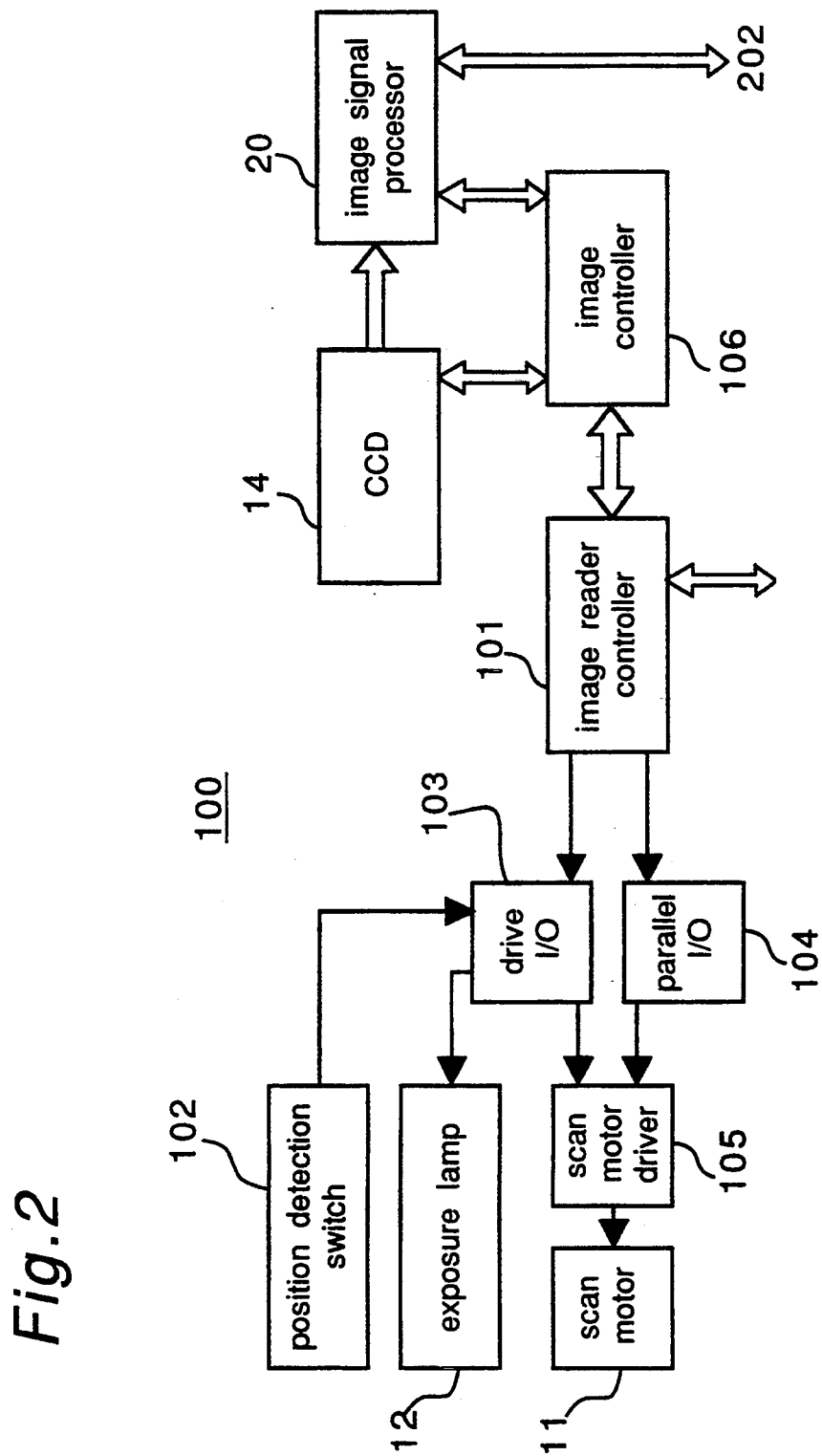
FIG. 2 is a block diagram of a part of the control system of the copying machine.
Figure 3:
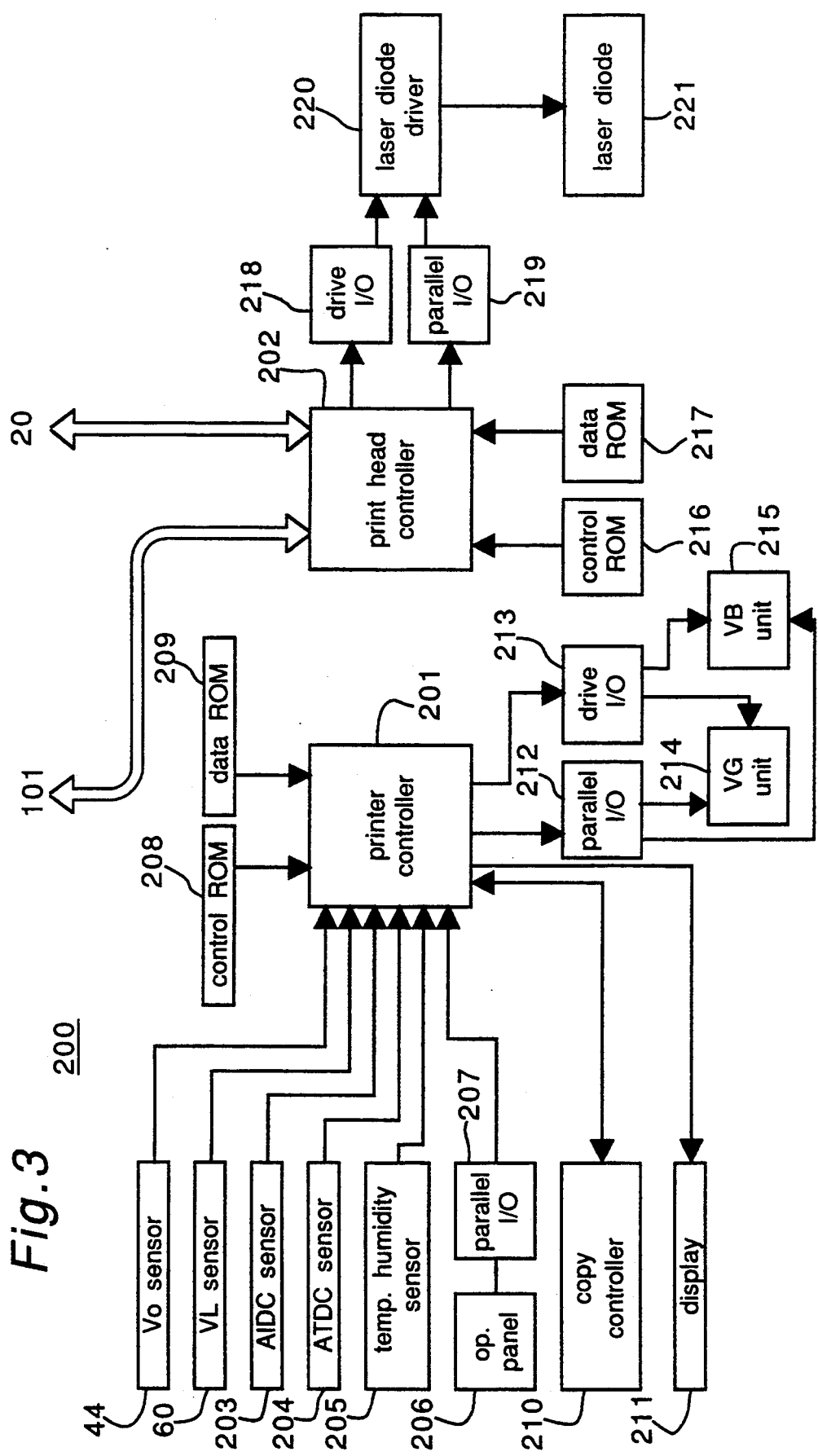
FIG. 3 is a block diagram of the other part of the control system of the copying machine.

FIGS. 2 and 3 show a whole block diagram of the control system of the digital color machine. The image reader 100 is controlled by an image reader controller 101. The controller 101 controls the exposure lamp 12 via a drive I/O 103 according to a position signal from a position detection switch 102 which indicates the position of a document on the platen 15 and controls a scan motor driver 105 via a drive I/O 103. The scan motor 11 is driven by the scan motor driver 105.

On the other hand, the image reader controller 101 is connected via a bus to an image controller 106. The image controller 106 is connected to the CCD color image sensor 14 and the image signal processor 20. The image signal from the CCD color image sensor 14 is processed by the image signal processor 20.

The main body 200 includes a printer controller 201 for controlling the copying action and a print head controller 202 for controlling the print head 31. The printer controller receives analog signals from various sensors 44, 60 and 203–205 for automatic image density control. Various data inputted with an operational panel 206 are sent to the printer controller 201 via a parallel I/O 207. The printer controller 201 is connected to a control ROM 208 storing a control program and a data ROM 217 storing various data. The printer controller 201 controls a copying controller 210 and the display panel 211 according to the data from the operational panel 206 and the data ROM 209 under the contents of the control ROM 208. Further, the printer controller 201 controls high voltage units 214 and 215 for the grid voltage of the sensitizing charger 43 and for the developer bias voltage of the developer 45a–45d.

The print head controller 202 acts according to the control program stored in the control ROM 216. The print head controller 202 is connected to the image signal processor 202 of the image reader 100 via an image bus and performs gamma correction on the basis of the image signal received via the image data bus with reference to a conversion table stored in the data ROM 217. Further, a dither processing is performed if necessary to express gradation. Then, the print head controller 202 controls the laser diode controller 220 via the drive I/O 218 and a parallel I/O 216, and the laser diode controller 220 controls the emitting of the laser diode 221. Further, the print head controller 202 is synchronized with the printer controller 201 and with the image signal processor 20 to each other via buses.

(b) Image Signal Processing (b-1) Structure of Image Data Processing

Figure 4:
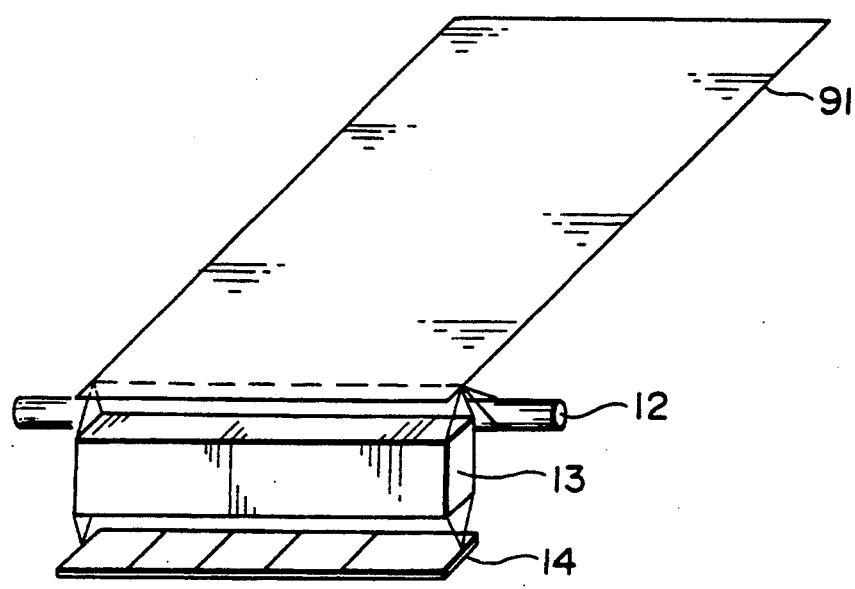
FIG. 4 is a perspective view of a reading device.

FIG. 4 shows a perspective view of a reading device, in which a surface of a document 91 is illuminated by the light source (halogen lamp) 12 having an optical spectrum of three wavelengths (R, G and B). The light reflected from the document 91 is focused with the rod lens array 13 linearly on the light-receiving plane of the CCD sensor 14. The optical system including the rod lens array 13, the light source 12 and the CCD color image sensor 14 is moved in the direction of the arrow shown in FIG. 1, and the optical information of the document 91 is converted to an electrical signal by the CCD color image sensor 14.

Figure 5:
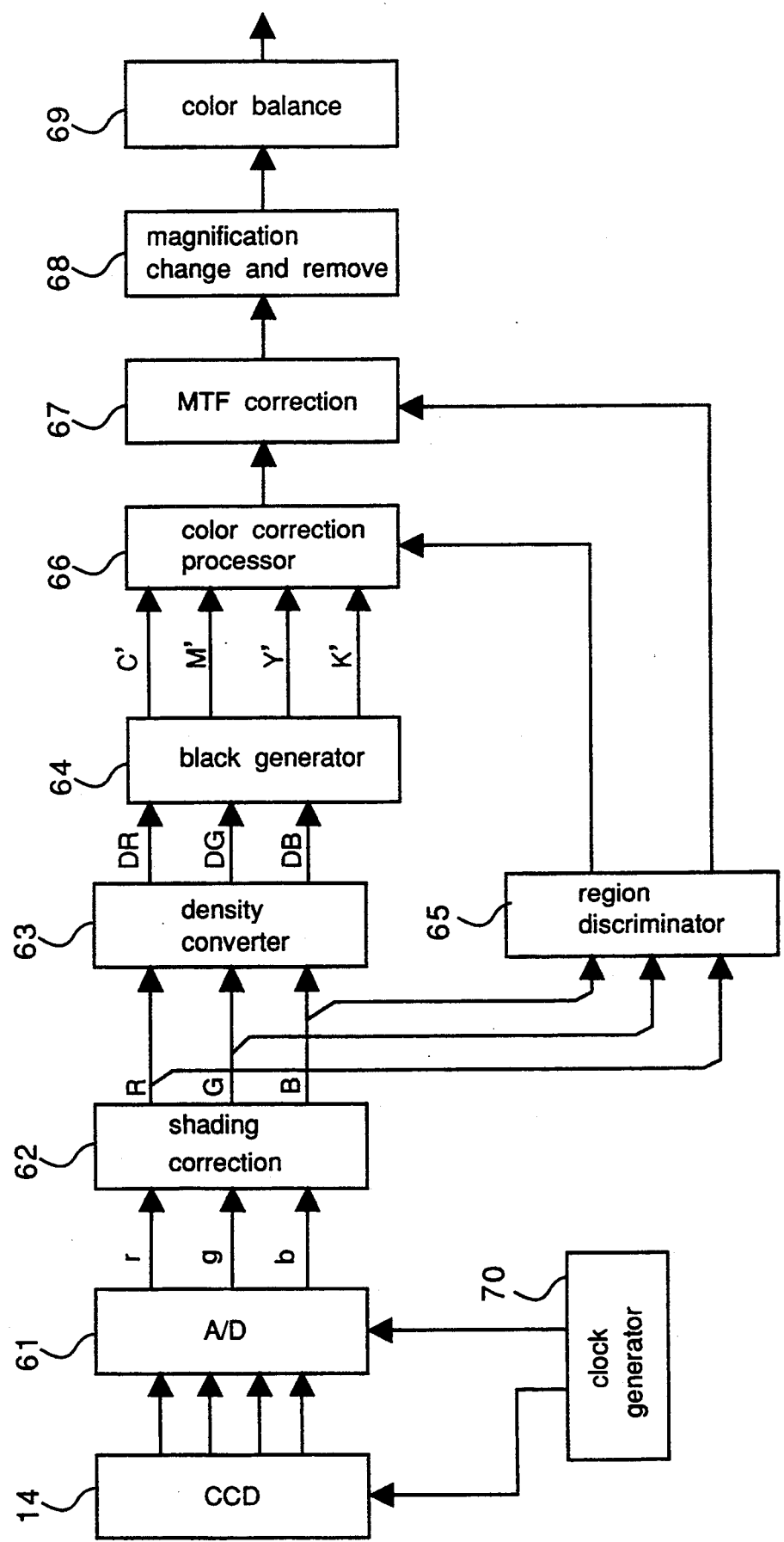
FIG. 5 is a block diagram of an image signal processor.

FIG. 5 shows a block diagram of the image signal processor 20 which processes the image signal from the CCD color image sensor 14 via the image signal processor 20 to the print head controller 202 as explained below.

In the image signal processor 20, the image signal obtained by the photoelectric conversion by the CCD sensor 14 is converted to multi-value digital image data of R, G and B by an A/D converter 61. A clock generator 70 generates clock signals to be sent to the CCD color image sensor 14 and to the A/D converter 61. The converted image data is subjected to shading correction by a shading correction part 62, and then the image data is converted to density data according to logarithmic conversion by a density converter 63. Further, a true black data K' is generated from the density data by a black generator 64.

On the other hand, the characteristic of the image data after the shading correction is extracted for each pixel on a local region including the pixel to classify into flat density portions, edge portions and intermediate portions.

Figure 6:
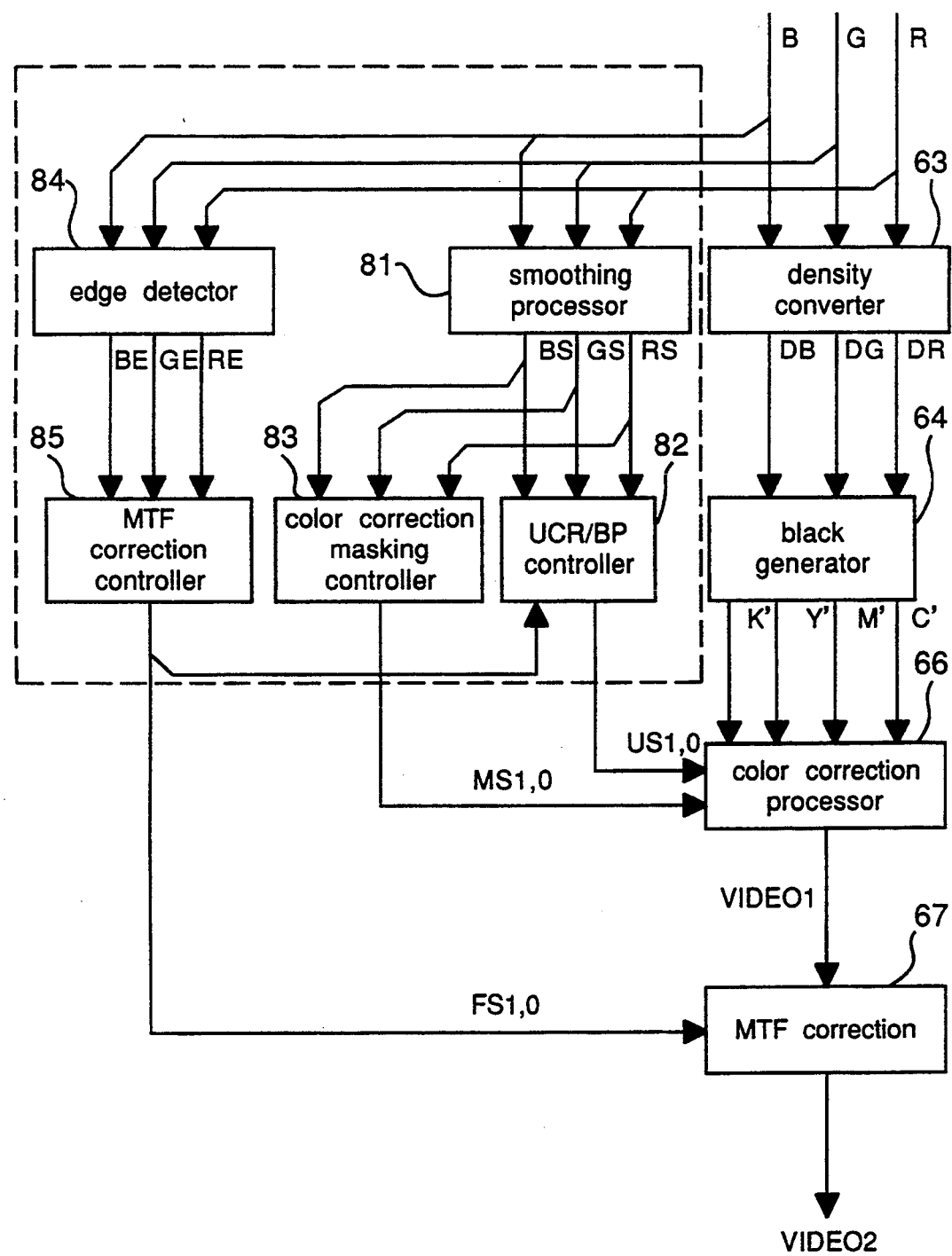
FIG. 6 is a circuit diagram of a region discriminator.

FIG. 6 shows a circuit of the region discriminator 65. After an edge detector 84 processes the image data R, G and B received from the shading correction part 62 in order to detect an edge, an MTF correction controller 85 sends 2-bit filter select signals $FA_0$ and $FA_1$ to an MTF correction part 67. On the other hand, after a smoothing processor 81 processes the image data R, G and B for filtering, the image data are processed by an under color remove/black paint (UCR/BP) controller 82 and by a color correction masking controller 83 to send 2-bit (four steps) achromatic-chromatic color decision signals $US_1$, $US_0$ and two-bit (four kinds) masking coefficient select signals $MS_0$, $MS_1$ to a color correction processor 66.

In the color correction processor 66, black color data is generated and masking processing is performed at the same time in accordance to the achromatic/chromatic decision signals $US_1$ and $US_0$ and the masking coefficient select signals $MS_1$ and $MS_0$ received from the region discriminator 65. That is, a black data is generated from the read density data and the latters are converted to data of the three reproduction colors. Further, in the MTF correction part 67, a digital filter is selected in accordance to the filter select signal $FS_1$ and $FS_0$ from the region discriminator 65 to perform smoothing or edge emphasis.

Next, a magnification change and remove part 68 may change the magnification, if necessary. Further, the color balance is adjusted by a color balance part 69 to send data to the print head controller 202.

A signal $M/\overline{C}$ to indicate monochromatic mode or full color mode is sent from the print head controller 202 to the image signal processor 20.

Figure 7:
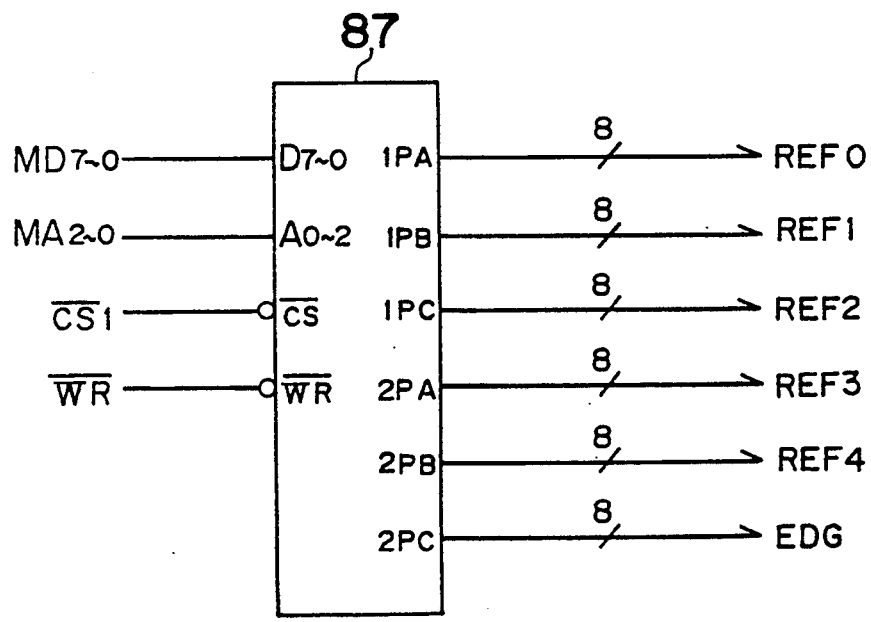
FIG. 7 is s circuit diagram of a register for setting various parameters.
Figure 8:
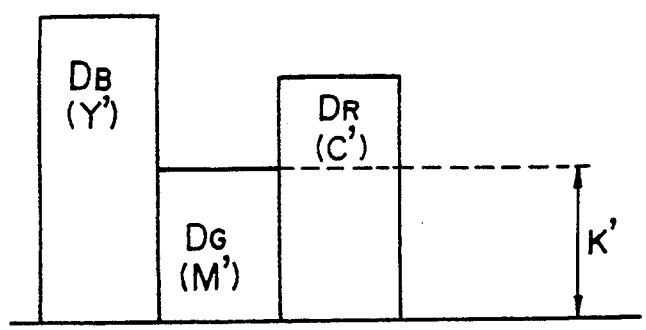
FIG. 8 is a graph for showing the relation of the black quantity K' with density data.

As shown in FIG. 7, a register 87 sets various control parameters according to a data bus $D_7$ - $D_0$, an address bus $MA_2$ - $MA_0$, a chip select signal $\overline{CS_1}$ and a write signal $\overline{WR}$ received from the print head controller 202. Then, the register 87 sends control parameters REF0, REF1 and REF2 to the under color remove/black paint controller 82, control parameters REF3 and REF4 to the MTF correction controller 85 and a control signal EDG to the MTF correction part 67.

(b-2) Region Discrimination and Outline of Image Data Processing

The outline of region discrimination and processings in relation therewith are explained before detailing each processings of the image signal processing. In this embodiment, the region discriminator 65 extracts following three characteristics from the read data of R, G and B for each pixel in a local region including the pixel at the center: (a) achromatic/chromatic color (achromatic/chromatic color decision signal US, refer section (e-3)), (b) edge detection (filter select signal FS, refer section (h-2)), and (c) hue decision (masking coefficient select signal MS, refer section (f-2)). Then, the color correction processor 66 optimizes a black amount (USR/BP ratios) according to the decisions on the achromatic/chromatic color and on the edge detection, while the MTF correction part 67 performs smoothing or edge emphasis with spatial digital filter processing.

(1) Achromatic color and flat density: The black amount is increased and the data of the reproduction colors M, C and Y are smoothed according to the result of achromatic/chromatic color decision.

(2) Edge portion irrespective of achromatic/chromatic color: The result of achromatic/chromatic color decision is canceled, the black amount is decreased and edge emphasis is performed on the reproduction colors C, M and Y.

(3) Chromatic color and flat density: The black amount is decreased and smoothing is performed on the reproduction colors C, M and Y.

(4) Others: The black amount is intermediate and no edge emphasis and no smoothing are performed.

Further, the color correction processor 66 has linear masking coefficients in accordance with a plurality of color groups, so that the masking processing is performed by using linear masking coefficients of the color group which includes the hue according to the result of hue decision.

In the monochromatic mode, the black amount is chosen to be zero and the linear masking coefficients for monochromatic mode are used.

(c) density conversion

The density converter 63 converts the output data of the CCD color image sensor 14 so that the document density (OD) is linear for naked eyes. The output of the CCD color image sensor 14 has a linear photoelectric conversion characteristic according to the intensity of incident light (=document reflectance OR). On the other hand, the document reflectance OR and the document density OD has a relation of $-\log OR = OD$. Then, the nonlinear read characteristic of the CCD color image sensor 14 is converted to the linear characteristic by using a reflectance/density conversion table. To be concrete, a reflectance/density conversion table 346 is used to convert the read data for R, G and B of a central pixel under processing to density data DR, DG and DB.

(d) black generation

Data C', M', B' and K' of cyan, magenta, blue and black for full-color reproduction are made for each scan successively, and a full-color image is reproduced with use of total four scans. Black printing is performed because pure black is hard to be reproduced by the overlap of cyan, magenta and yellow toners owing to the effects of spectral characteristics of each toner. Then, in the full color copying machine of this embodiment, the reproducibility of black is improved and a full color image is realized by using the subtractive mixture of data Y', M' and B' and the black painting according to black data K'.

The black generator 64 generates the black amount K from the components R, G and B of red, green and blue which represent the lightness on the document as follows: Because the data DR, DG and DB received from the density converter 63 are density data of R, G and B components, they are equal to the components C', M' and Y' of cyan, magenta and yellow which are complementary colors of red, green and blue read by the CCD sensor 14. Therefore, the minimum of DR, DG and DB corresponds to the overlap of C', M' and Y' on the document, and the minimum can be taken as the black data K'. Thus, the black generator 64 detects the black data K' = MIN (DR, DG, DB).

As explained later, the black data K' obtained from the black data is used when the data of reproduction colors are derived in the color correction part 66. That is, the data C', M' and Y' are subtracted by $\alpha \cdot K'$, while $\beta \cdot K'$ is sent as the black amount K, wherein $\alpha$ designates a UCR ratio and $\beta$ designates a BP ratio. In order to improve the reproducibility of black, the parameters $\alpha$ and $\beta$ can be changed after smoothing by four steps according to the characteristics of a local region including the central pixel under processing.

Figure 9:
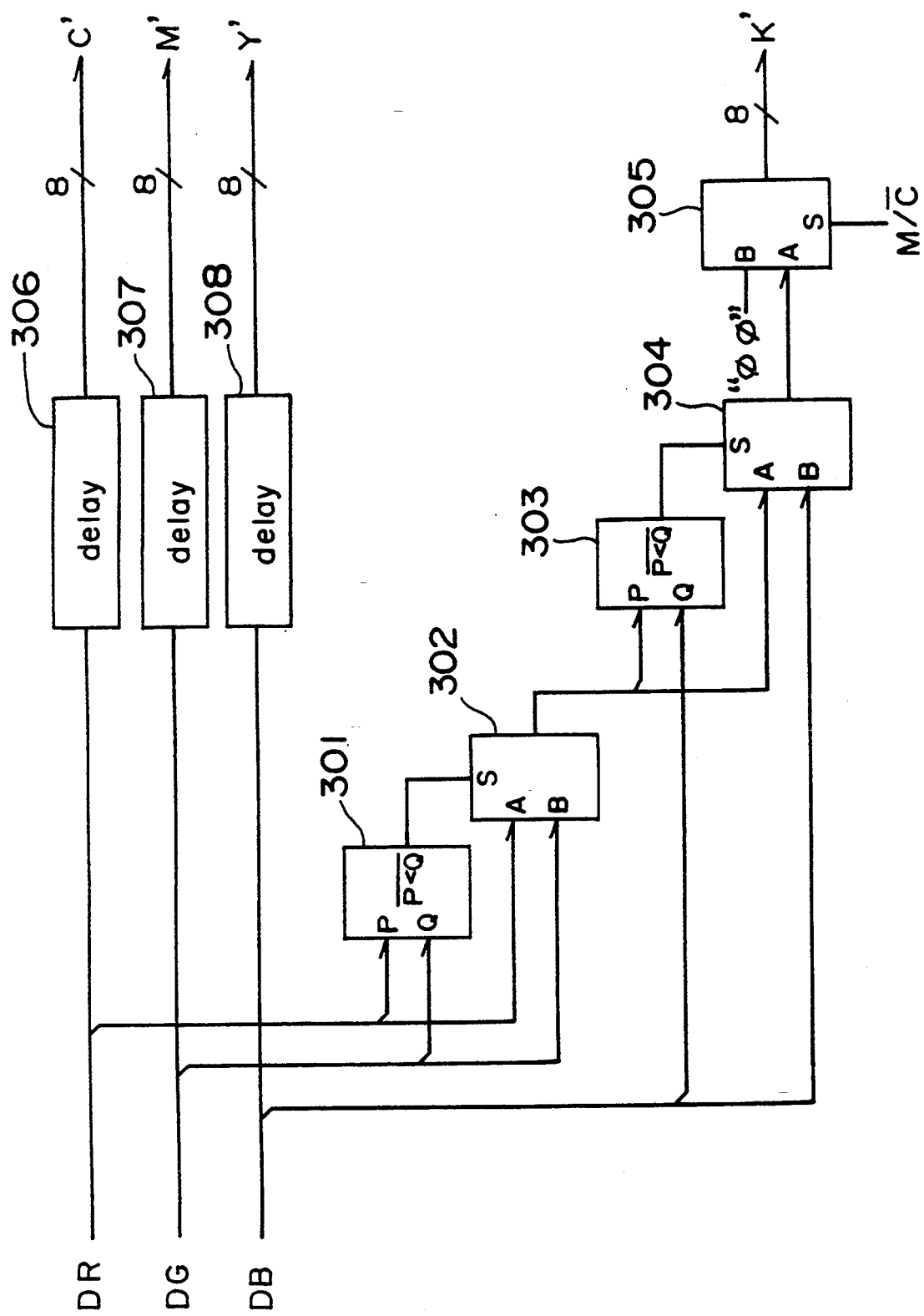
FIG. 9 is a circuit diagram of a black generator.

Next, the black generator 64 shown in FIG. 9 is explained. A comparator 301 compares a red data DR with a green data DG, and a 2-input multiplexer 302 sends the smaller value between DR and DG to a comparator 303. The comparator 303 compares the input value with a blue data DB, and a 2-input multiplexer 304 sends the smallest value among DR, DG and DB to a 2-input multiplexer 305. The 2-input multiplexer 305 sends the minimum (C: full color mode) or "00" (N: monochromatic mode) according to the signal $M/\overline{C}$.

The signal M/C̄ determines the image output mode. If the signal is "L" level, the mode is full color mode and the minimum is outputted. On the other hand, if the signal is "H" by level, the mode is monochromatic mode and K' is set as an appropriate value for an actual output image. In this embodiment, K' is set always to be zero in the monochromatic mode and the data K' for black paint is cleared. Delay circuits 306, 307 and 308 are used to adjust timings. It is to be noted that though the reference signs C', M' and Y' of the output data are changed from those DR, DG and DB of the input data, they represent the same data substantially.

(e) Automatic Control of Under Color Remove/Black Paint in Region Discrimination (Decision of Achromatic/Chromatic Color)

(e-1) Object of Automatic Control of Under Color Remove/Black Paint

As explained above, the black generator 64 detects K'=MIN (DR, DG, DB) as the black data K' and the color correction part 66 subtracts $\alpha \bullet K'$ from C', M' and Y' and sends $\beta \bullet K'$ as the K amount when the data K is calculated. The UCR ratio $\alpha$ determines the black quantity and the BP ratio $\beta$ decreases the color data. The UCR/BP ratios affect the saturation of color reproduction and the visibility of achromatic color.

The reproducibility of achromatic color is improved if the UCR/BP ratios ($-\alpha/\beta$) are increased because achromatic color is reproduced with pure black K'. On the contrary, the saturation of chromatic color is lowered because the output ratio of K' increases. Therefore, the improvement of the visibility of achromatic color may be compatible with that of the saturation of chromatic color by controlling the UCR/BP ratios according to the decision whether the color is achromatic or not.

However, the decision is liable to err if the decision is performed on the read data of R, G and B (primary colors), and the erroneous decision causes the image quality to deteriorate. The causes of the erroneous decision include errors due to Moire patterns of dot document caused by the image reader system and due to errors and noises both on reading a document of uniform density and on reading a portion where the hue and lightness change gradually.

First, smoothing processing (method of moving averages with weighting) on the read data R, G and B of a central pixel under processing is performed in a local region including the pixel. Then, the levels of R, G and B are compared to decide if the color of the pixel is an achromatic color or not. Further, in order to improve the reproducibility of black, the parameters $\alpha$, $\beta$ are changed at four steps (refer to FIG. 11) according to the characteristics of the region after the smoothing processing, and the UCR/BP ratios are increased as the color becomes more achromatic.

(e-2) Smoothing

Smoothing processing is performed for automatic under color remove/black paint of a region of 5×5=25 pixels including the central pixel under processing. In the smoothing processor 81 shown in FIG. 10, a method of moving averages with weighting addition is performed for the central pixel under processing for each color with use of 5×5 filter 344 on the 8-bit R, G and B data (level 0–255) normalized with shading correction by the shading correction part 62. That is, first, data of four lines are stored in four line memories 340, 341, 342 and 343. Then, smoothing is performed with the filter 344 for smoothing processing on the center pixel by using the data R2 (G2, B2), R3 (G3, B3), R4 (G4, B4) and R5 (G5, B5) of the four lines and the data R1 (G1, B1) of the line on which data is being received. Next, the smoothed data RS (GS, BS) are sent to the under color/black paint part controller 82 and to the color correction masking controller 83. In the filter 344, the weighting is given gradually with the central pixel under processing at the center as shown in the numerals in the filter.

By using the smoothing processing with the spatial frequency filter 344, it becomes possible to prevent a spurious resolution of pixels for high frequencies and to extract lower frequency components. Then, the following advantages can be obtained: (a) noise reduction in an image of uniform density, (b) reduction of Moire pattern of dot document, and (c) smoothing in an image where the hue, the lightness and the saturation change gradually. Thus, the precision of decision is improved. The data RS (GS, BS) smoothed as mentioned above are used for hue decision (automatic masking control) in the under color remove/black paint controller 82 and for achromatic/chromatic decision (automatic UCR/BP control) in the color correction masking controller 83.

(e-3) Decision of Chromatic/Achromatic Color

Figure 11:
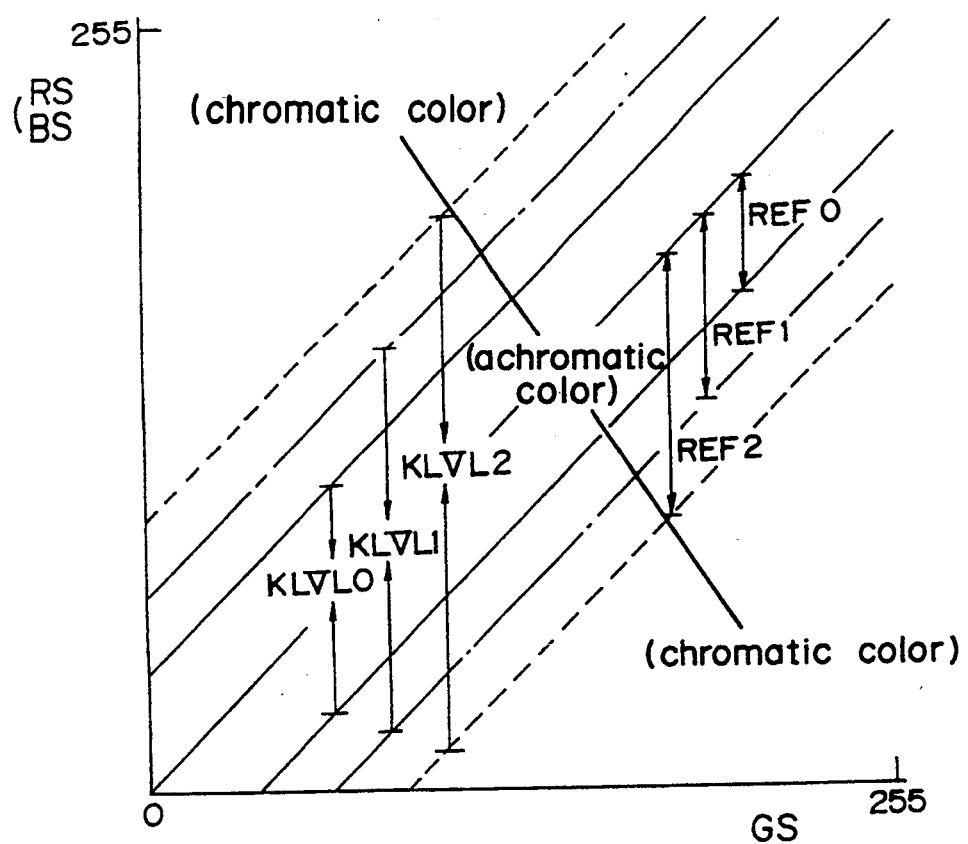
FIG. 11 is a graph for displaying four domains between chromatic color and achromatic color.

The decision of achromatic color (black) in the under color remove/black paint part 82 is performed by using that the read data R, G and B of three colors become almost equal to each other for an achromatic color. FIG. 11 displays the distribution of domains between chromatic color and achromatic color for the decision. The decision is performed for each pixel. In FIG. 11, the data RS, GS and BG of a pixel which have been smoothed are classified in four distribution domains from achromatic color to chromatic color, as shown in Table 1: a range $\overline{KLVL0}$ is confined by two solid lines (GS−REF0 <RS, BS<GS+REF0), a range $\overline{KLVL1}$ is confined by two dot and dashed lines (GS−REF1<RS, BS<GS+REF1) and a range $\overline{KLVL2}$ is confined by two dashed lines (GS−REF2<RS, BS<GS+REF2). Then, the achromatic/chromatic color decision signal US$_1$, US$_0$ is generated as shown in Table 1. If the data is in a range displayed as $\overline{KLVL0}$, the color is decided to be a chromatic color, while if the data is outside the range displayed as $\overline{KLVL2}$, the color is decided to be a chromatic color. Further, two domains are provided between them. Then, the UCR/BP ratios are changed stepwise according to the value 0, 1, 2 and 3 of the 2-bit decision signal US$_0$, US$_1$. The UCR/BP ratios increase as the color become more achromatic.

TABLE 1

| FS$_0$ | $\overline{KLVL0}$ | $\overline{KLVL1}$ | $\overline{KLVL2}$ | US$_{1,0}$ | $-\alpha/\beta$ | |
|---|---|---|---|---|---|---|
| L | L | — | — | 0 | $-\alpha_0/\beta_0$ | achromatic color |
| | H | L | — | 1 | $-\alpha_1/\beta_1$ | ↑ |
| | H | H | L | 2 | $-\alpha_2/\beta_2$ | ↓ |
| | H | H | H | 3 | $-\alpha_3/\beta_3$ | chroma- |

TABLE 1-continued

| $FS_0$ | $\overline{KLVL0}$ | $\overline{KLVL1}$ | $\overline{KLVL2}$ | $US_{1,0}$ | $-\alpha/\beta$ |
|---|---|---|---|---|---|
| H | — | — | — |  | tic color |

$-\alpha_0 \leq -\alpha_1 \leq -\alpha_2 \leq -\alpha_3$.
$\beta_0 \geq \beta_1 \geq \beta_2 \geq \beta_3$.
$(1 \geq \alpha_{0-3}, \beta_{0-3} \geq 0)$.

Figure 12:
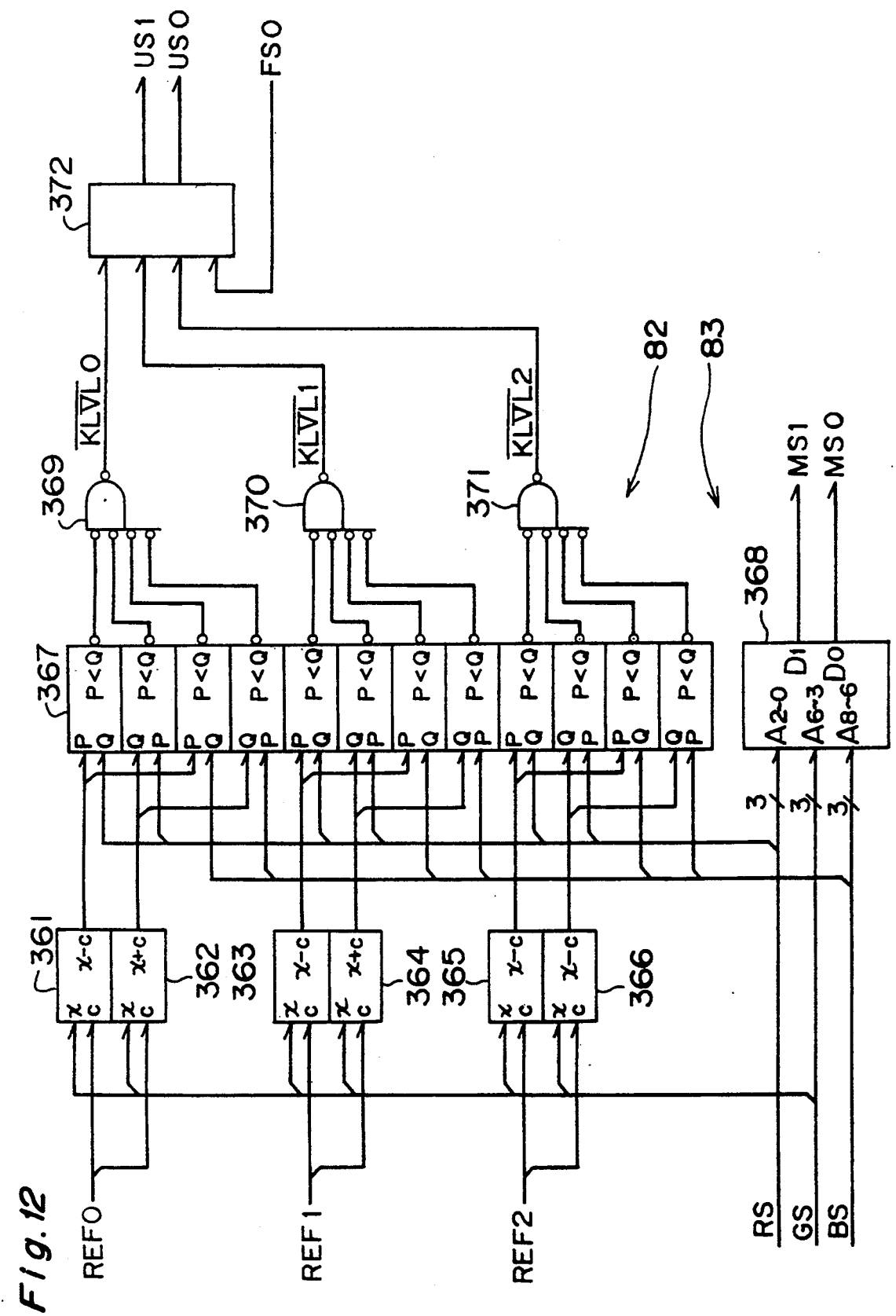
FIG. 12 is a circuit diagram of an under color remove/black paint circuit and a color correction controller.

In the circuit of the under color remove/black paint controller 82 shown in FIG. 12, it is decided which distribution domain the data RS, RG, RB for each pixel belong to. In this decision, a prescribed value is added and subtracted from the data GS of reference color to determine the level difference from the other two colors. That is, the subtracter 361 subtracts REF0 from GS and the adder 362 adds REF0 to GS to get GS−REF0 and GS+REF0. Then, these values are compared with RS, GS and BS by four comparators in the twelve comparators 367. Then, the results are sent to a NAND gate 369, and $\overline{KLVL0}$="L" is sent to a table (ROM) 372 when GS−REF0 <RS, BS<GS+REF0. Similarly, the subtracter 363 subtracts REF1 from GS and the adder 364 adds REF1 to GS to get GS−REF1 and GS+REF1. Then, these values are compared with RS, GS and BS by four comparators in the twelve comparators 367. Then, the results are sent to a NAND gate 370, and $\overline{KLVL1}$="L" is sent to the table (ROM) 372 when GS−REF1<RS, BS<GS+REF1. Similarly, the subtractor 365 subtracts REF2 from GS and the adder 366 adds REF2 to GS to get GS−REF2 and GS+REF2. Then, these values are compared with RS, GS and BS by four comparators in the twelve comparators 367. Then, the results are sent to a NAND gate 370, and $\overline{KLVL2}$="L" is sent to the table (ROM) 372 when GS−REF2<RS, BS<GS+REF2. The table 372 sends 2-bit achromatic/chromatic color decision signal $US_1$, $US_0$ according to the selection table in Table 1.

In the table 372, the decision is canceled if the filter select signal $FS_0$ supplied from the MTF correction controller 85 is equal to "L". That is, the achromatic/chromatic decision signal $US_1$, $US_0$ ="3" is sent for decreasing the black amount. The filter select signal $FS_0$ is sent if the edge detection amount in the main scan direction or subscan direction is more than the prescribed level REF3. This is intended to decrease the ratio of errors in the achromatic/chromatic color decision. That is, because the pixel is at an edge portion in this case, the achromatic/chromatic color decision is liable to err. Then, the achromatic/chromatic decision is set beforehand not to be performed for a pixel which is decided to be at an edge portion. In other words, the under color remove/black paint control is optimized only for a portion of an image where the image density is relatively uniform, and this prevents the image deterioration due to errors of the decision.

As explained above, in the under color remove/black paint controller 82 and the color correction masking controller 83, various select signals ($US_1$, $US_0$, $MS_1$, $MS_0$, $FS_1$, $FS_0$) are generated to determine correction parameters and they are sent to the color correction part 66 and the MTF correction part 67.

(f) Automatic Masking Control in Region Discriminator (Hue Decision)

(f-1) Object of Automatic Masking Control

Masking calculation is performed in the MTF correction part 37 in order to reproduce an image from full-color input data. Linear masking coefficients are determined in order to minimize the average color difference over the whole color reproduction region. However, the color difference is not necessarily minimized in some parts in the color reproduction region and the errors for color reproduction and for gradation may become large. Then, it is said the second-order masking processing including second order terms such as $DR^2$, $DG^2$, $DB^2$, DR•DG, DG•DB and DB•DR is better, as mentioned above. However, this needs a complicated and larger circuit.

Then, though this embodiment used the linear masking processing, a plurality of linear masking coefficients is provided in the color correction processor 66 for the four groups (primary color group, complementary color group and two intermediate groups). The color correction masking controller 83 decides the image data, and the masking coefficient is selected so as to minimize the color difference in the decided hue. Thus, the color reproducibility in this processing is similar to the secondary masking processing.

Further, in the masking processing, the data RS, GS and BS which have been smoothed by the smoothing processor 81 (FIG. 10) are used in order to prevent the errors in the masking as in the case of the achromatic/chromatic decision.

(f-2) Hue Decision

The hue decision performed by the color correction masking controller 83 uses a color correction table (ROM) 368 as shown in FIG. 12. The upper 3-bits of the RS, GS and BS data are inputted to the address $A_8$-$A_0$ of the color correction table 368, and the 2-bit masking coefficient select signal $MS_1$, $MS_0$ are outputted.

Figure 13:
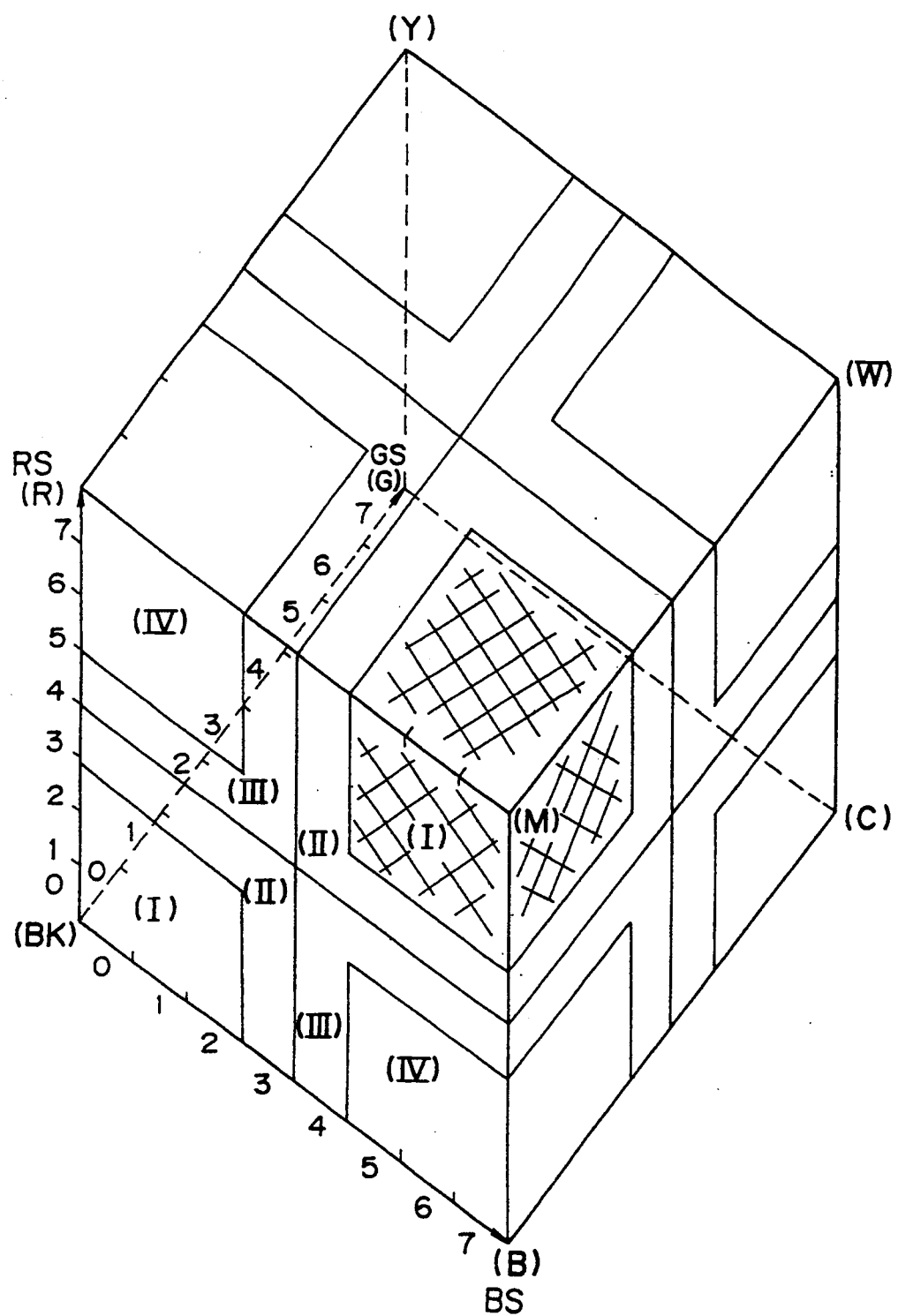
FIG. 13 is a cubic diagram of hue distribution.

The hue is classified into an R, G, B, W system (primary colors), a C, M, Y, BK system (complementary colors) and two intermediate groups. In a cube shown in FIG. 13, RS, GS and BS are taken as the three coordinate axes. The apexes represent pure components of cyan (C), green (G), blue (B) and white (W). Therefore, the R, G, B, W group is located in four small cubes including the apexes of (R), (G), (B) and (W). The C, M, Y, BK group is similar to the R, G. B, W group. One of the intermediate groups is located adjacent to the cubes of the C, M, Y, BK group, while the other of the intermediate groups is located adjacent to the cubes of the R, G, B, W group. As shown in FIG. 13, for example, in the (R), (M), (BK), (B) plane, the area (I) belongs to the C, M, Y, BK group, the area (II) belongs to the intermediate group close to the C, M, Y, BK group, the area (III) belongs to the intermediate group close to the R, G, B, W group, and the area (IV) belongs to the R, G, B, W group.

As explained above, the masking is divided largely into the R, G, B masking and the C, M, Y masking. This is because the two sets of (R, G, B) and (C, M, Y) distribute hues sparsely at an appropriate degree. That is, when a color sample including hues distributed sparsely at an appropriate degree is used, the masking coefficients do not have values not so different from each other. Therefore, when the decision on the (R, G, B) group and the (C, M, Y) group are performed, the erroneous decision does not cause large trouble. Further, the intermediate area between the two groups are divided into two groups in order to reduce troubles even if an erroneous decision happens.

The color correction table 368 decides what group the color of the pixel belongs to according to the input data RS, GS and BS. If the result is (I), $MS_{1,0} =$ "3" is outputted; if the result is (II), $MS_{1,0} =$ "2" is outputted; if the result is (III), $MS_{1,0} =$ "1" is outputted; and if the result is (IV), $MS_{1,0} =$ "0" is outputted.

(g) Color Correction

Figure 14:
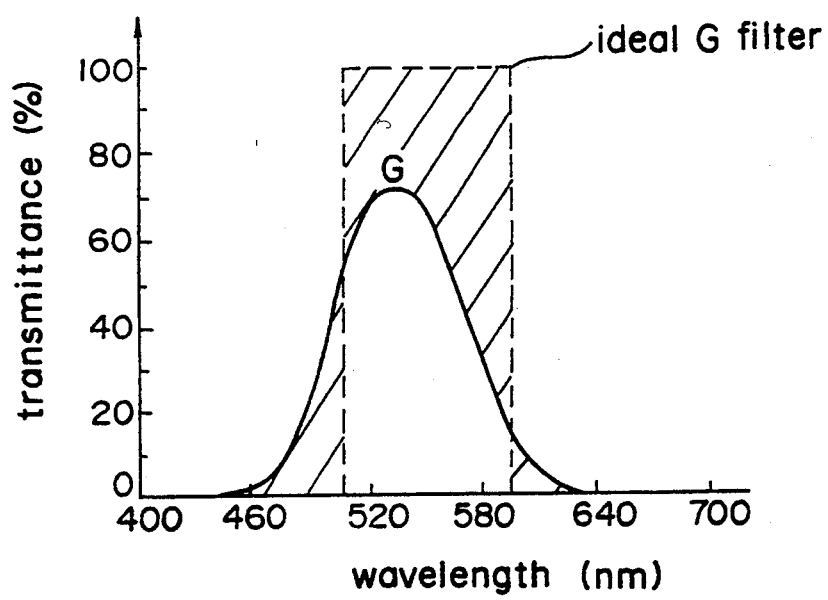
FIG. 14 is a graph of the characteristic of green filter.
Figure 15:
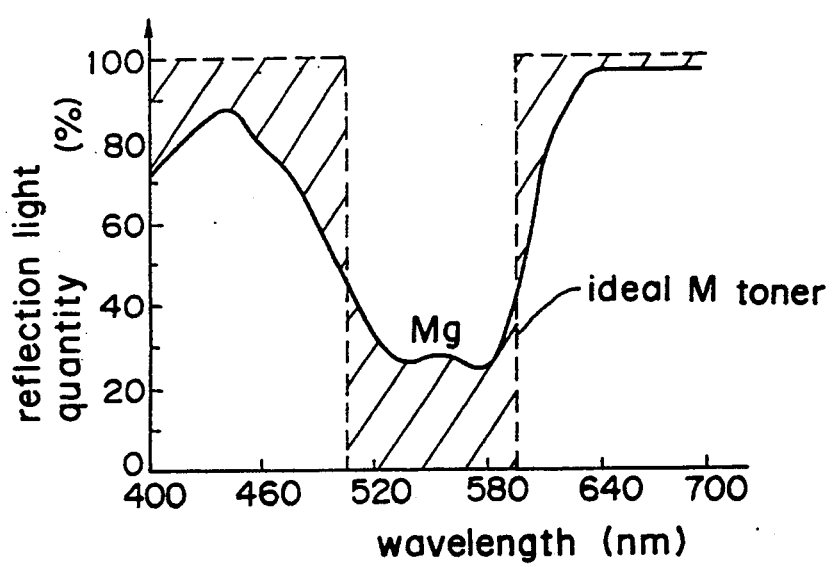
FIG. 15 is a graph of the characteristic of magenta toner.

The color correction processor 66 corrects according to the transmission characteristics of each filter R, G and B in the CCD color image sensor 14 and the reflection characteristics of each toner C, M and Y in the printer to make match to the ideal color reproduction. For example, the transmission characteristics of G filter shown in FIG. 14 and the reflection characteristics of magenta toner include non ideal wavelength region displayed with hatch in contrast to ideal characteristics. In order to correct this discrepancy from the ideal characteristics, the color correction processor 66 performs linear correction according to the following masking equation besides the above-mentioned black paint:

$$\begin{pmatrix} C \\ M \\ Y \\ K \end{pmatrix} = \begin{pmatrix} A_c & A_m & A_y & 0 \\ B_c & B_m & B_y & 0 \\ C_c & C_m & C_y & 0 \\ 0 & 0 & 0 & \beta \end{pmatrix} \times \begin{pmatrix} C'(DR) - \alpha \cdot k' \\ M'(DG) - \alpha \cdot k' \\ Y'(DB) - \alpha \cdot k' \\ K' - d \end{pmatrix}. \quad (1)$$

$$K' = MIN (DR, DG, DB). \quad (2)$$

Because the printing is performed successively on the four colors, cyan, magenta, yellow and black, the masking equation (1) is calculated by one line for each printing.

Figure 16:
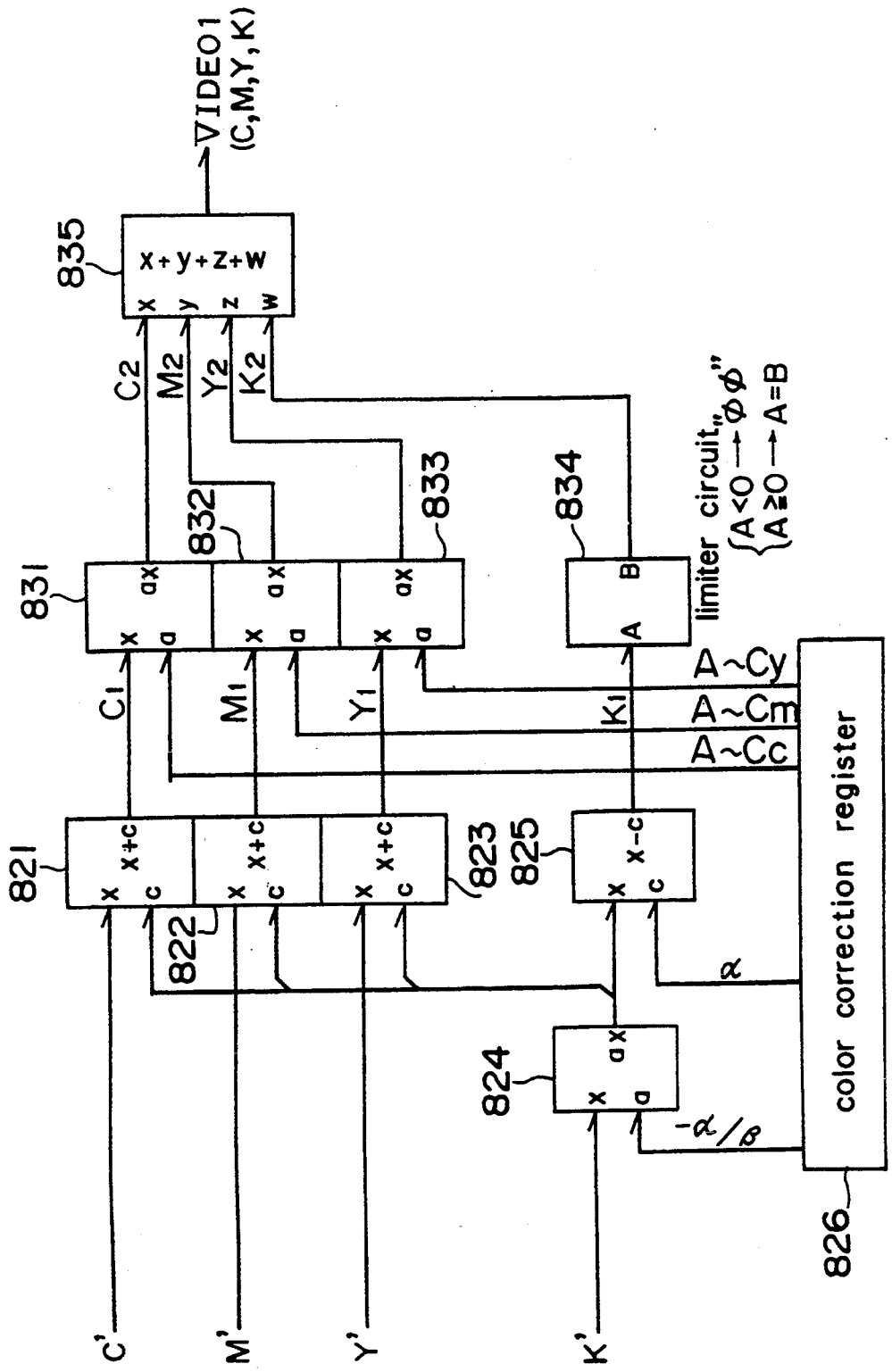
FIG. 16 is a circuit diagram of a color correction processor.

In the circuit of the color correction processor 66 shown in FIG. 16, black paint control and color masking processing are performed by using the parameter UCR/BP ratios $(-\alpha/\beta)$ determined in the color correction register 826 in correspondence to the correction parameters determined in the region discriminator 65. The various kinds of coefficients are set in the color correction register displayed in detail in FIG. 17 according to the characteristics of the region.

Figure 17:
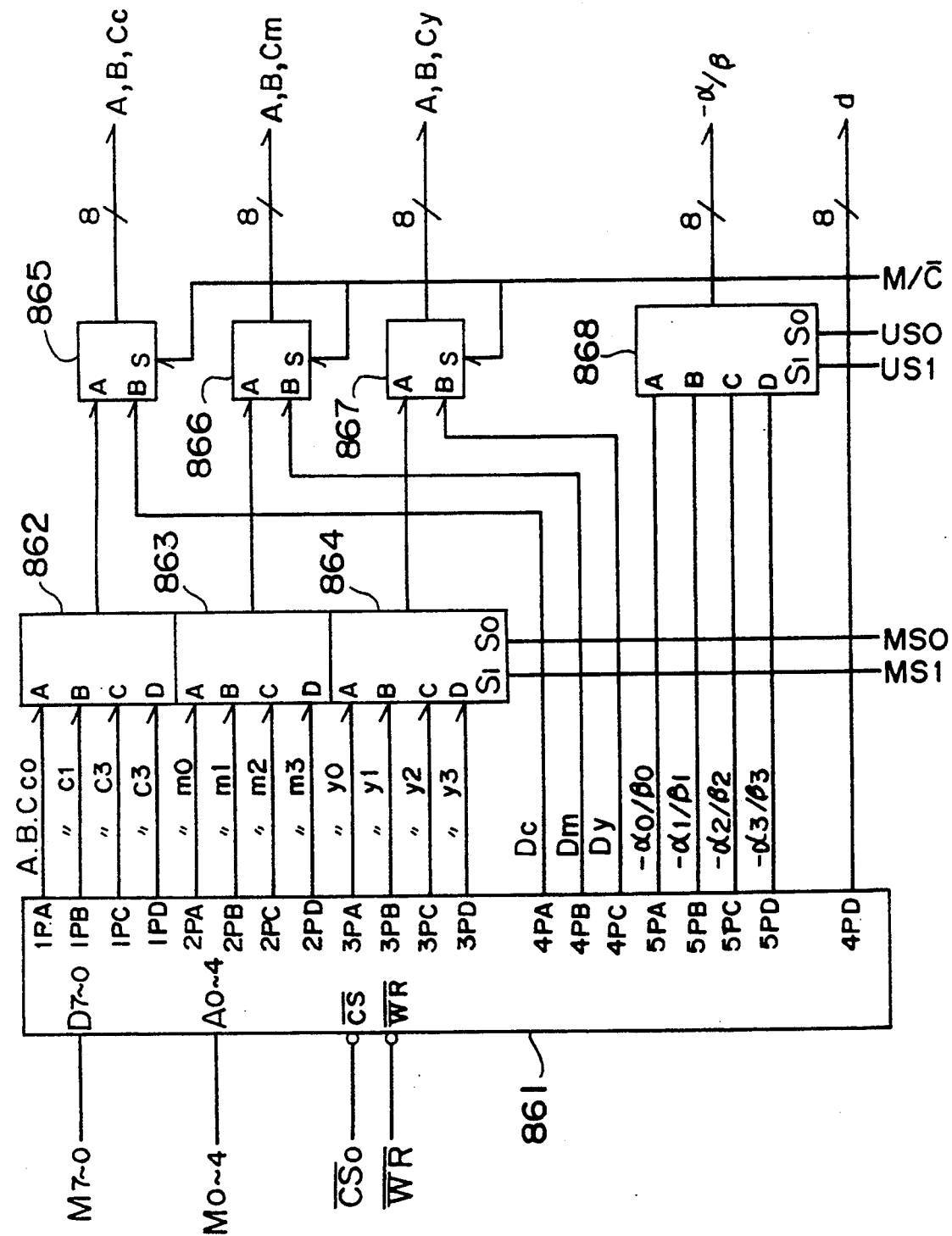
FIG. 17 is a circuit diagram of color correction register.

As displayed in FIG. 17, the color correction register 826 sends masking coefficients of the three colors ($A_{ci}$, $B_{ci}$, $C_{ci}$, $A_{mi}$, $B_{mi}$, $C_{mi}$, $A_{yi}$, $B_{yi}$, $B_{yi}$), which are an element $(M)_{ji}$ (j=c, m, y; i=1, 2, 3) of 3 ×3 matrix $M_k$, and UCR/BP ratios $(-\alpha/\beta)$ and d. The first masking coefficient $M_0$ (k=0) to be selected when $MS_{1,0} =$ "0" makes the color difference small for primary colors R, G, B, while the fourth masking coefficient $M_3$ (k=3) to be selected when $MS_{1,0} =$ "3" makes the color difference small for complementary colors C, M, Y. Further, the second masking coefficient $M_2$ (k=1) is obtained as $(\frac{2}{3})M_0 + (\frac{1}{3})M_3$ with weighting for primary colors, while the third masking coefficient $M_3$ (k=2) is obtained as $(\frac{1}{3})M_0 + (\frac{2}{3})M_3$ with weighting for complementary colors. That is, the masking coefficients of the intermediate groups are set by mixing the masking coefficients for primary colors and for complementary colors in order to reduce hue change due to erroneous decision on color reproduction.

The following matrix shows the masking coefficient $M_0$ for R, G and B:

$$\begin{pmatrix} 0.809 & 0.150 & 0.245 \\ 0.300 & 1.111 & -0.081 \\ 0.134 & -0.252 & 1.936 \end{pmatrix} \quad (3)$$

Further, the following matrix shows the masking coefficient $M_3$ for C, M and Y:

$$\begin{pmatrix} 0.724 & 0.465 & 0.107 \\ 0.230 & 1.193 & -0.063 \\ 0.231 & -0.090 & 2.020 \end{pmatrix} \quad (4)$$

For comparison, an ordinary masking coefficient will also be shown below.

$$\begin{pmatrix} 0.775 & 0.378 & 0.124 \\ 0.265 & 1.150 & -0.063 \\ 0.187 & -0.151 & 2.006 \end{pmatrix} \quad (5)$$

In the color correction register shown in FIG. 17, a register 861 sends the above-mentioned four kinds of masking coefficients for each color to multiplexers 862, 863 and 864 according to the data bus ($MD_7$-$MD_0$), the address bus ($MA_4$-$MA_0$), a chip select signal $CS_0$ and write signal WR from the print head controller 202. On the other hand, the multiplexers 862, 863 and 864 select a kind of masking coefficient according to the select signal $MS_{1,0}$ received from the color correction masking controller 83 and send it to the 2-input multiplexers 865, 866 and 867. Further, the 2-input multiplexers 865, 866 and 867 also receive coefficients $D_c$, $D_m$, $D_y$ for monochromatic mode. The multiplexers 865, 866 and 867 select one of them according to the mode select signal M/C. On the other hand, the four kinds of UCR/BP ratios are selected by a multiplexer 868 according to the signal $US_{1,0}$.

The constant "d" displayed in FIG. 17 is used to improve the visibility at a low density. However, it is not explained in detail here for the brevity of explanation. In the above-mentioned processing, "d" is set to be zero for the brevity of explanation.

The color correction processor shown in FIG. 16 consists of the black paint part 82 and the color correction masking part 83. In the black paint part 82, when the under color is removed to print C, M, Y colors, the black data K' received from the black generator 64 is multiplied with the UCR ratio $(-\alpha)$ received from the color correction register 826. Then, the product $(-\alpha \bullet K')$ is added with the complementary color data C', M' and Y' by adders 821, 822 and 823 to send the results as under color remove values $C_1$, $M_1$ and $Y_1$. On the other hand, when black paint is controlled for printing black, the black quantity K' is multiplied with the BP ratio $\beta$ received from the color correction register 926 by an adder 824 to sent the product $(\beta \bullet K')$ via a limiter 834 to an adder 835.

In the color correction masking part, multipliers 831, 832 and 833 multiplies the data $C_1$, $M_1$, $Y_1$ with the masking coefficients ($A_c$ -$C_c$, $A_m$-$C_m$, $A_y$-$C_y$) received from the color correction register 826. Then, the obtained multiplied values $C_2$, $M_2$, $Y_2$ are added in an adder 835 to give a data VIDEO1. At this time, the output from a limiter 834 is cleared as "00", and the adder 835 sends the result of the addition of $C_2$, $M_2$ and $Y_2$.

On the other hand, when black paint is controlled, the color correction register 826 sets "00" in the multipliers 831, 832 and 833. Therefore, $C_2$, $M_2$ and $Y_2$ are cleared and only $K_1$ (=$K_2$) is sent through the limiter 834 as the VIDEO1 data.

Figure 18:
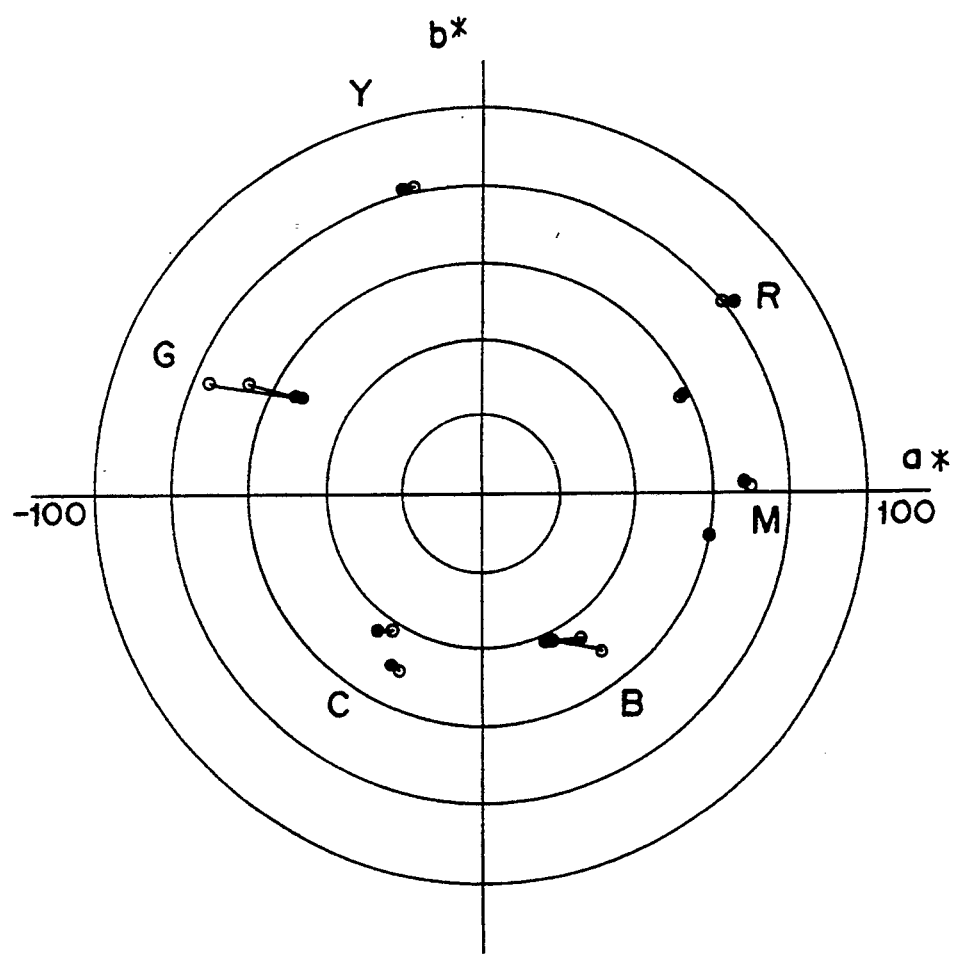
FIG. 18 is a diagram for showing color differences when ordinary masking coefficients are used.

Examples of the masking correction effect will be displayed below. FIG. 18 shows document colors (represented as open circles) and reproduction colors (represented as solid circles) in the uniform color space of CIE 1976 by using L*a*b* system when the ordinary masking coefficient is used. In FIG. 18, the a*-b* plane displays hue and saturation and the L* direction perpendicular to the a*-b* plane displays lightness.) The difference between the document color and the reproduction color corresponds the color difference. In this case, the average color difference of only R, G and B is 10.5334, while that of only C, M and Y is 4.0029.

Figure 19:
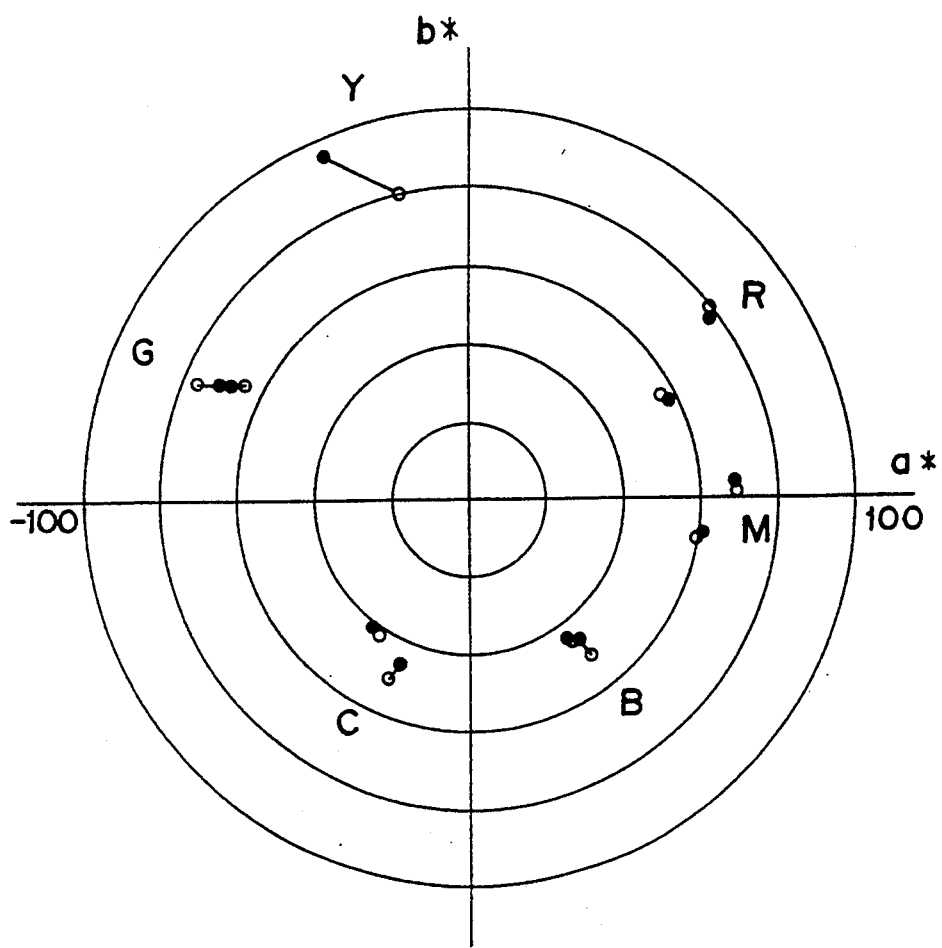
FIG. 19 is a diagram for showing color differences when masking coefficients ($M_0$) for R, G and B are used.
Figure 20:
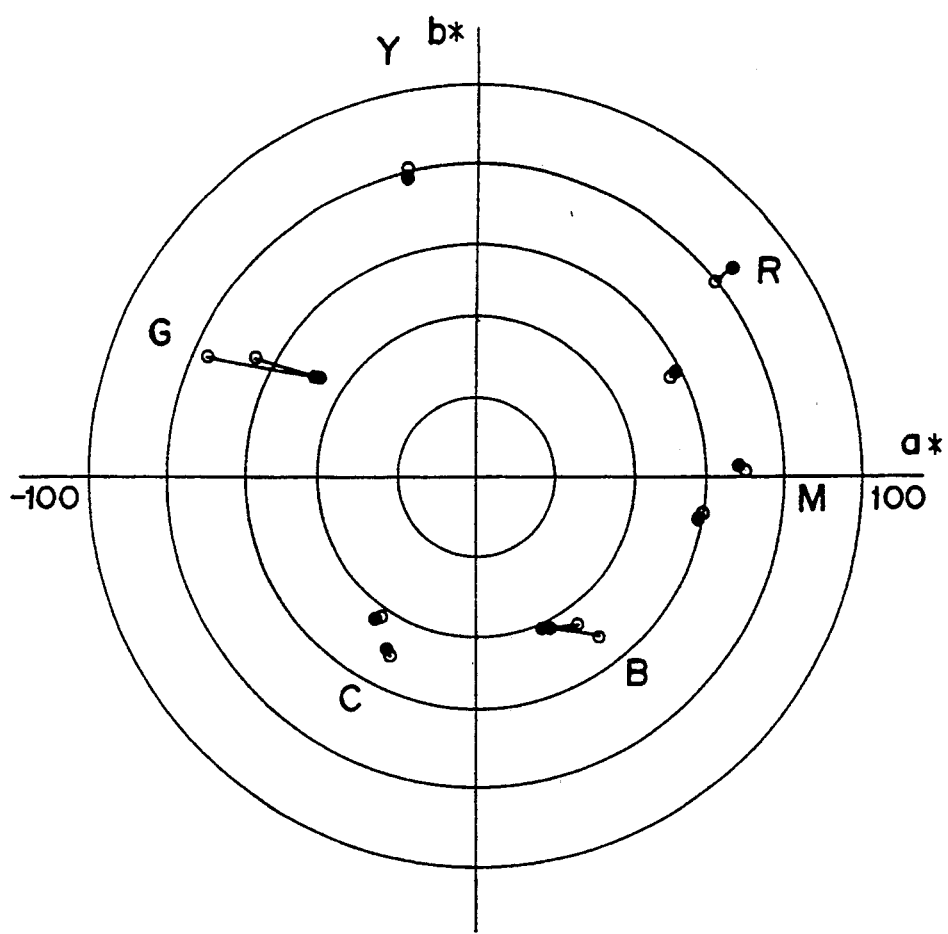
FIG. 20 is a diagram for showing color differences when masking coefficients ($M_3$) for C, M and Y are used.

FIG. 19 displays document colors (open circles) and reproduction colors (solid circles) in the a*-b* plane when the masking coefficient $M_0$ for R, G and B is used. In this case, the average color difference of only R, G and B is 3.8576 which is much smaller than that obtained with use of the ordinary masking coefficient. The color difference of only C, M and Y is 12.1797. Further, FIG. 20 displays document colors (open circles) and reproduction colors (solid circles) in the a*-b* plane when the masking coefficient $M_3$ for C, M and Y is used. In this case, the average color difference of only C, M and Y is 2.43782 which is much smaller than that obtained with use of the ordinary masking coefficient. As explained above, the color difference of a hue can be decreased by selecting an appropriate masking coefficient.

When monochromatic mode is set with the M/C signal, the color reproduction is performed with use of a single color. The monochromatic reproduction means that the density information according to the sensitivity (relative luminous sensitivity) with which a man senses light when toners of one of C, M, Y, K, R (M+Y), G (B+Y) and B (C+M) are used. Therefore, the relative luminous sensitivity information (MC) may be obtained with use of linear processing with the masking coefficient, as in the above-mentioned masking processing.

$$MC = D_c \cdot C' + D_m \cdot M' + D_y \cdot Y'.$$

That is, the color correction register 826 sets $D_c$, $D_m$ and $D_y$ as the masking coefficients, and the data MC is sent as the data VIDEO1. The masking coefficients are determined according to the kind of toners in correspondence with the sensitivity.

As explained above, the black paint is not carried out in this case. That is, in the black generation part 64 shown in FIG. 9, K'="00" is generated always in the monochromatic mode.

(h) Automatic Control of Edge Emphasis/Smoothing in Region Discriminator (Edge Decision)

(h-1) Object of Edge Emphasis/Smoothing

In general, as to a monochromatic image, character/photograph automatic discrimination is performed according to the density change or density distribution of image. Then, edge emphasis is performed for a character image, while smoothing is performed for a photograph image. Thus, the sharpening and smoothing of image can be made compatible to optimize the MTF correction.

However, as already mentioned above, as to a color image, simple edge emphasis is not necessarily performed well because the image density changes according to the hue and the saturation. For example, when color changes from white to red, edge emphasis may be performed, while when color changes from red to cyan, edge emphasis has not to be performed because the hue changes anomalously at an edge. An image of human facial skin is especially affected by such processing. Therefore, the control has to be performed by extracting only a change in the lightness of image.

(h-2) Edge Detection

Figure 10:
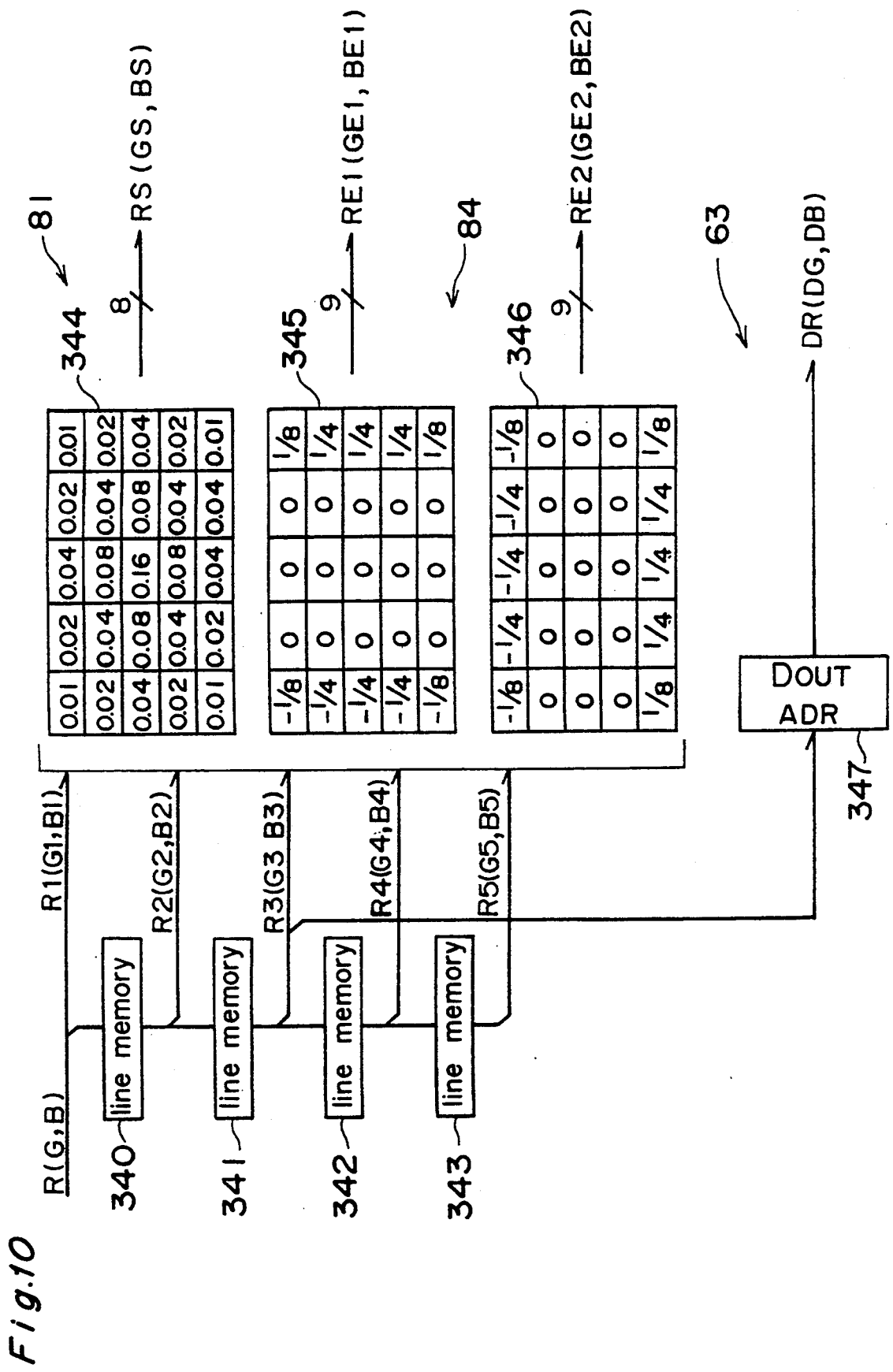
FIG. 10 is a circuit diagram of a smoothing processor and an edge detection circuit.

In the edge detection part 84 shown in FIG. 10, the edge detection is performed on the 8-bit R, G, B data (level 0–255) normalized for shading correction by the shading correction part 62 as to an region around a central pixel under processing, for each color, both in the main scan direction and in the subscan direction. That is, data of four lines are stored successively in the four line memories 340, 341, 342 and 343. Then, by using the data R2 (G2, B2), R3 (G3, B3), R4 (G4, B4) and R5 (G5, B5) of the four lines and the data R1 (G1, B1) of the line on which data is being received, an edge is detected with a filter 345 for detecting an edge in the main scan direction and with another filter 346 for detecting an edge in the subscan direction, on the center pixel in the central line. Next, the output data RE1 (GE1, BE1) and RE2 (GE2, BE2) for the two directions are sent to the MTF correction controller 85.

In the above-mentioned edge detection with use of the filters 345 and 346, the gradient and the gradient direction are extracted for the two directions. The gradient means the absolute value of the output data RE1 (GE1, BE1) and RE2 (GE2, BE2) and the gradient direction means the sign (plus or minus) of the gradient. In an edge portion where the lightness changes rapidly, a hue change such as color ghost phenomenon may occur. Therefore, the output data are used to extract a portion where an error in achromatic/chromatic color decision is liable to occur and to select a region where the MTF correction has to be performed.

As explained above, the data of the central pixel under processing is sent to the density converter 63 to be changed to the density data DR (DG, DB) with the reflection light quantity/density conversion table 347.

Figure 21:
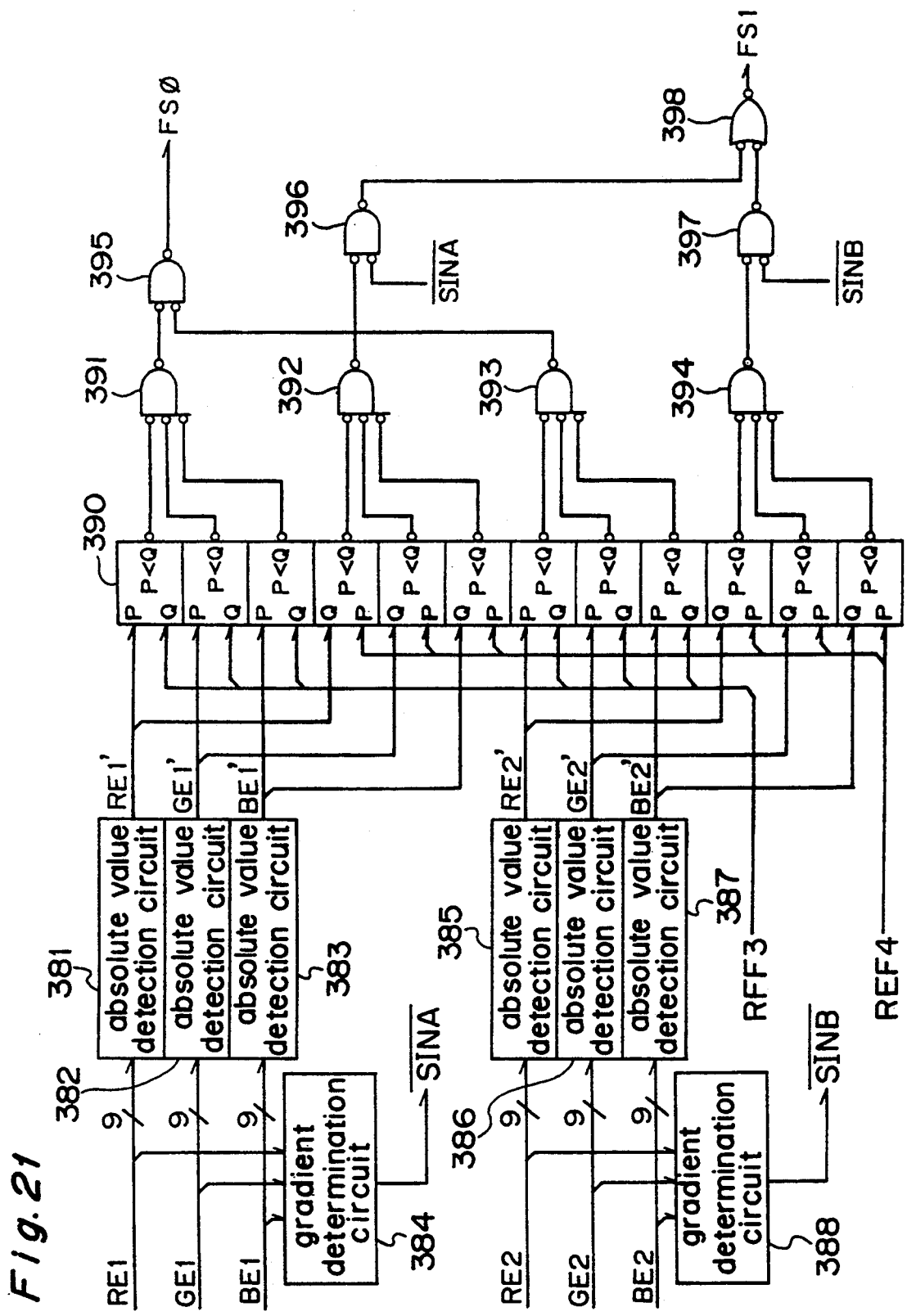
FIG. 21 is a circuit diagram of an MTF correction circuit.

FIG. 21 shows the circuit of the MTF correction controller 85 to control the MTF automatic control. In this circuit, an flat density area, an edge and the intermediate area between the flat density area and the edge are selected according to the signal from the edge detector 84. A flat density area means an area where the edge detection quantity of R, G, B data is smaller than a threshold value (REF3) both in the main scan direction and in the subscan direction. Then, the filter select signal $FS_0$="L" is sent. On the other hand, an edge area means an area where the edge detection quantity of R, G, B data is larger than a threshold value REF4 in the two directions and the gradient directions in the two directions agree with each other. Then, the filter select signal $FS_1$="L" is sent. In order to prevent errors due to hue change, an edge is detected as to lightness change between achromatic colors (such as white, black-like base level, and black characters and narrow lines ) and as to a change between an achromatic color and a chromatic color (such as white, ground level such as color patch, and red/blue characters and narrow lines). If both filter select signals are not "L", the area is in the intermediate area.

In the MTF correction control circuit shown in FIG. 21, edge detection quantities RE1, GE1 and BE1 in the main scan direction are converted to absolute values RE1', GE1' and BE1' by the absolute value detection circuits 381, 382 and 383. The absolute values RE1', GE1' and BE1' are compared with the threshold value REF3 by the comparator 390, and if all the absolute values are smaller than the threshold value REF3, a signal is sent via a negative logic AND gate 391 to a negative logic AND gate 395. The absolute values RE1', GE1' and BE1' are also compared with the threshold value REF4 by the comparator 390, and if all the absolute values are smaller than the threshold value REF4, a signal is sent via a negative logic AND gate 392 to a negative logic AND gate 396. On the other hand, the gradient determination circuit 384 detects the gradient (sign) of the edge from the edge detection quantities RE1, GE1 and BE1, and the sign is sent to the negative logic AND gate 396. Therefore, the AND gate 366 sends a filter select signal $FS_1$ (="L") via an OR gate 398 if the edge detection quantity in the main scan direction is larger than the threshold value REF4 and the gradient directions of the R, G and B data agree with each other (or if the pixel is decided to be at an edge portion).

Similarly, edge detection quantities RE2, GE2 and BE2 in the subscan direction are converted to absolute values RE2', GE2' and BE2' by the absolute value detection circuits 385, 386 and 387. The absolute values RE2', GE2' and BE2' are compared with the threshold value REF3 by the comparator 390, and if all the absolute values are smaller than the threshold value REF3, a signal is sent via a negative logic AND gate 393 to the negative logic AND gate 395. Therefore, the AND gate 395 sends a filter select signal $FS_0$ if edge detection quantities are smaller than the threshold value REF3 both in the main scan direction and in the subscan direction (flat density portion). Similarly, the absolute values RE2', GE2' and BE2' are also compared with the threshold value REF4 by the comparator 390, and if all the absolute values are smaller than the threshold value REF4, a signal is sent via a negative logic AND gate 394 to the negative logic AND gate 397. On the other hand, a gradient determination circuit 388 detects the gradient (sign) of the edge from the edge detection quantities RE2, GE2 and BE2, and the gradient direction is sent to the negative logic AND gate 397. Therefore, the AND gate 367 sends a filter select signal $FS_1$ (="L") via the OR gate 398 if the edge detection quantity in the subscan direction is larger than the threshold value REF4 and the gradient directions of the R, G and B data agree with each other (or if the pixel is decided to be at an edge portion).

Figure 22:
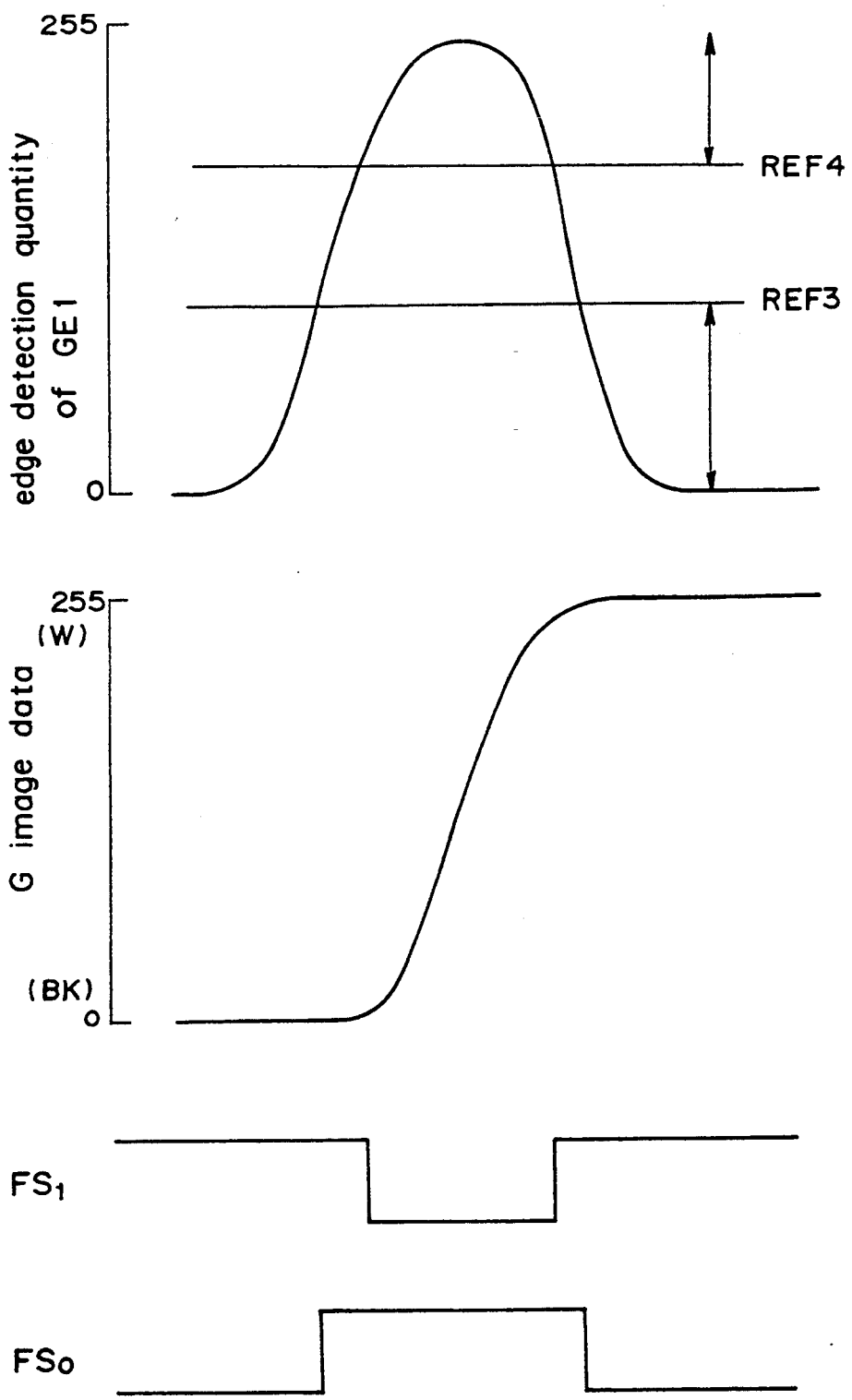
FIG. 22 is a diagram for showing an example of edge detection.

FIG. 22 displays schematically the edge detection quantity (GE1) with use of the filter 345 when a G image data changes in the main scan direction. The edge detection quantity is compared with the threshold values REF3 and REF4, and filter select signals $FS_0$ and $FS_1$ are sent according to the comparison results. The signal $FS_1$ is sent if either of the gradient signals SINA and SINB is "L".

The threshold values REF3 and REF4 used in the MTF correction controller 85 can be adjusted with the setting of sharpness externally (refer to FIG. 7). For example, if a user intends to intensify sharpness, the threshold values REF3 and REF4 are set smaller.

In this embodiment, REF3 is set to be smaller than REF4. However, REF3 may be set to be larger than REF4 if necessary.

(i) MTF Correction

The filter select signals $FS_1$ and $FS_0$ set by the MTF correction controller 85 are used to select a spatial filter in the MTF correction part 66. If $FS_0$="L" (flat density portion) or if no edge is detected on the data R, B, G in the main scan and subscan directions for each color, the smoothing processing is performed on the data C, M, Y, K converted from the R, G, B data, and the achromatic/chromatic color decision is allowed. For an image of low saturation, if the achromatic/chromatic color decision is allowed, a large change in the K quantity seems to be random image noises. Therefore, the MTF correction part performs smoothing so as not to take attention. (This is also a reason that the achromatic/chromatic decision is classified in four steps. However, this is insufficient, and the noises are reduced further for pixels decided to be achromatic colors.) Further, image noises and Moire patterns due to reading can be also reduced and smoothing becomes possible of a portion such as a photograph where the lightness, saturation and hue change gradually.

If $FS_1$="L" (edge portion), the output of the Laplacian filter 324 is allowed, and the edge emphasis of an image is performed by adding with the central pixel under processing. Therefore, the sharpening of image can be performed at an edge portion of achromatic color without increasing the UCR/BP ratios and the visibility is improved.

Figure 23:
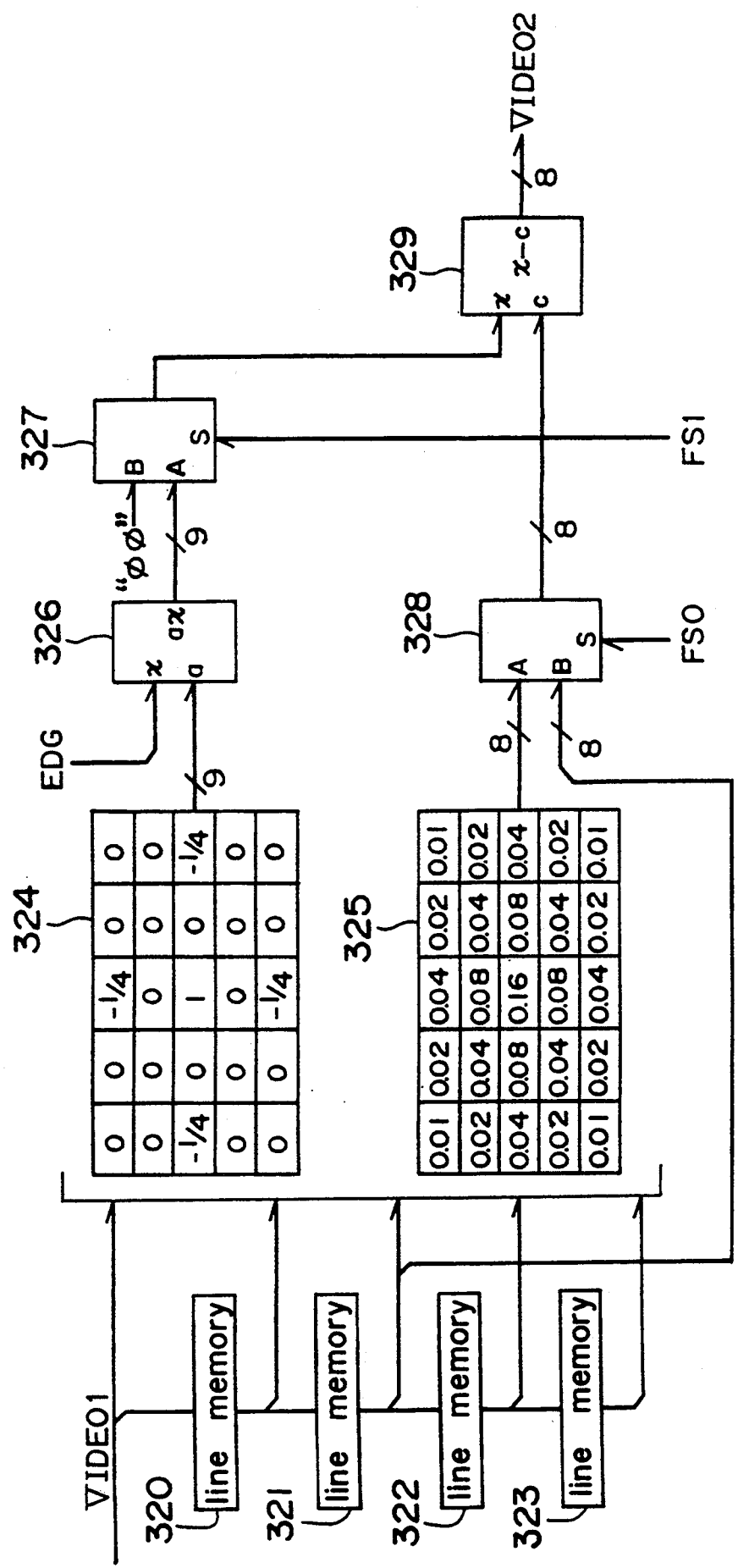
FIG. 23 is a circuit diagram of the MTF correction circuit.

The MTF correction part 66 shown in FIG. 23 performs edge emphasis and smoothing with use of 2-dimensional digital filter of FIR. First, data of four lines are stored in four line memories 320, 321, 322 and 323 successively. Then, the data of four lines and the data of a line which is being received are processed with a 5×5 digital filter 324 for second differentials (for edge emphasis) and with a 5×5 digital filter 325 for smoothing to be sent to a multiplier 326 and to a 2-input multiplexer 328, respectively. The multiplier 326 sends a product of the output of the digital filter 324 and an EDG value to a 2-input multiplexer 327, which sends the product or "00" according as the filter select signal $FS_1$="L" (edge portion) or "H". On the other hand, the multiplexer 328 selects the output smoothed by the digital filter 325 or the output of the pixel from the line memory 321 not smoothed by the digital filter 325 according as the filter select signal $FS_0$="L" (flat density portion) or "H" to send to an adder 329. The adder 329 adds the two inputs to send the result as a signal VIDEO2.

The secondary differential filter 324 used for edge emphasis detects an edge emphasis quantity of image, and edge emphasis is performed by adding the result of the linear transformation of the edge emphasis quantity obtained by the filter with the central pixel under processing (original image +secondary differential). That is, if $FS_1$="L" (edge portion), the adder 329 adds the data for edge emphasis is added to the data of the central pixel under processing.

On the other hand, the filter 325 for smoothing with a method of moving averages with weighting addition of peripheral pixels reduces image noises and results smooth image data. (The method of moving averages prevents spurious resolutions such as Moire patterns by using filter processing.) That is, if FS₀="L" (flat density portion), only the smoothed data are sent from the adder 329.

The EDG value which affects edge emphasis in the MTF correction part 66 can be adjusted externally by setting sharpness (refer to FIG. 7). For example, the EGE value may be increased when the sharpness is intended to be increased.

The MTF processing explained above performs the sharpening and smoothing not of the reproduction data C, M, Y, but of the read data R, G, B. This is because the similar processing on the reproduction data performs edge emphasis even for a portion where the hue changes to deteriorate the color reproduction. Then, the MTF correction is performed selectively by extracting a change in lightness of the read data R, G, B.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processor, comprising:
   receive means for receiving electric signals representing color data on the colors of a plurality of pixels comprising an image;
   filtering means for filtering the color data electric signals received by said receive means;
   processing means for processing the color data electric signals and outputting the processed data;
   decision means for deciding a characteristic of each pixel based on the color data electric signals subjected to the filtering by said filtering means; and
   control means for changing contents of the processing of said processing means according to the characteristic decided by said decision means.

2. An image data processor according to claim 1, wherein said filtering means performs two-dimensional spatial filtering.

3. An image data processor according to claim 1, wherein said filtering means performs smoothing.

4. An image data processor according to claim 1, wherein the characteristic decided by said decision means is saturation of each pixel.

5. An image data processor according to claim 1, wherein the characteristic decided by said decision means is hue of each pixel.

6. An image data processor according to claim 1, further comprising edge detection means for detecting whether a pixel is located at an edge portion according to the color data electric signals received by said receive means, wherein said control means changes the contents of the processing of said processing means according to the detection of the pixel at an edge portion.

7. An image data processor, comprising:
   receive means for receiving electric signals representing additive mixture color data for a plurality of pixels comprising an image;
   processing means for processing the additive mixture color data electric signals received by said receive means and for outputting subtractive mixture color data used for reproduction of the image;
   filtering means for smoothing the additive mixture color data electric signals received by said receive means;
   decision means for deciding a characteristic of each pixel based on the additive mixture color data electric signals which has been subjected to smoothing by said filtering means; and
   control means for changing contents of the processing of said processing means according to the characteristic decided by said decision means.

8. An image data processor according to claim 7, wherein the characteristic decided by said decision means is saturation of each pixel.

9. An image data processor according to claim 7, wherein the characteristic decided by said decision means is hue of each pixel.

10. An image data processor, comprising:
    receive means for receiving additive mixture color data for a plurality of pixels comprising an image;
    filtering means for filtering the additive mixture color data received by said receive means;
    hue decision means for deciding hue of each pixel according to the additive mixture color data subjected to the filtering by said filtering means;
    memory means for storing a plurality of linear masking coefficients in correspondence to a plurality of hue;
    select means for selecting a linear masking coefficient among the plurality of linear masking coefficients according to the hue decided by said hue decision means; and
    masking means for converting the additive mixture color data received by said receive means to subtractive mixture color data and for performing linear masking processing by using the linear masking coefficient selected by said select means.

11. An image data processor according to claim 10, wherein said filtering means performs two-dimensional spatial filtering.

12. An image data processor according to claim 10, wherein said filtering means performs smoothing.

13. An image data processor according to claim 10, wherein said memory means stores a linear masking coefficient suitable for a monochromatic mode and said select means selects the linear masking coefficient when the monochromatic mode is set.

14. An image data processor, comprising:
    receive means for receiving three primary color data for a plurality of pixels comprising an image;
    saturation decision means for deciding saturation of each pixel according the three primary color data received by said receive means;
    memory means for storing a plurality of first and second coefficients in correspondence to saturation;
    select means for selecting first and second coefficients among the plurality of the first and second coefficients stored by said memory means according to the saturation decided by said decision means;
    black data generation means for multiplying the minimum of the three primary color data with the first coefficient selected by said select means and for sending the product of the multiplication as a black data; and
    color data generation means for subtracting a product from the three primary color data received by said receive means, which product being obtained by multiplying the minimum of the three primary color data with the second coefficient selected by said select means, and for outputting the difference of the subtraction as modified three primary color data.

15. An image data processor according to claim 14, wherein said saturation decision means comprising filtering means for smoothing the three primary color data received by said receive means, wherein the saturation of each pixel is decided on the three primary color data subjected to the smoothing processing by said filtering means.

16. An image data processor according to claim 14, wherein said first and second coefficients stored in the memory means are zero in a monochromatic mode.

17. An image data processor, comprising:
receive means for receiving three primary color data for a plurality of pixels comprising an image;
edge detection means for detecting a pixel at an edge portion according to the three primary color data received by said receive means;
saturation decision means for deciding saturation of each pixel according the three primary color data received by said receive means;
memory means for storing a plurality of first and second coefficients in correspondence to saturation and prescribed first and second coefficients;
select means for selecting first and second coefficients among the plurality of the first and second coefficients stored by said memory means according to the saturation decided by said saturation decision means when the edge detection means detects that the pixel is not at an edge portion, and for selecting the prescribed first and second coefficients when the edge detection means detects that the pixel is at an edge portion;
black data generation means for multiplying the minimum of the three primary color data with the first coefficient selected by said select means and for outputting the product of the multiplication as a black data; and
color data generation means for subtracting a product from the three primary color data received by said receive means, which product being obtained by multiplying the minimum of the three primary color data with the second coefficient selected by said select means, and for outputting the difference of the subtraction as modified three primary color data.

18. An image data processor according to claim 17, wherein said saturation decision means comprising filtering means for smoothing the three primary color data received by said receive means, wherein the saturation of each pixel is decided on the three primary color data subjected to the smoothing processing by said filtering means.

19. An image data processor, comprising:
receive means for receiving three primary color data for a plurality of pixels comprising an image;
edge detection means for detecting a pixel at an edge portion according to the three primary color data received by said receive means;
saturation decision means for deciding saturation of each pixel according the three primary color data received by said receive means;
memory means for storing a plurality of first and second coefficients in correspondence to saturation;

select means for selecting first and second coefficients among the plurality of the first and second coefficients stored by said memory means according to the saturation decided by said saturation decision means;
black data generation means for multiplying the minimum of the three primary color data with the first coefficient selected by said select means and for outputting the product of the multiplication as a black data;
color data generation means for subtracting a product from the three primary color data received by said receive means, which product being obtained by multiplying the minimum of the three primary color data with the second coefficient selected by said select means, and for outputting the difference of the subtraction as modified three primary color data; and
smoothing means for smoothing the black data generated by said black data generation means and the modified three primary color data generated by said color data generation means only when said edge detection means detects that the pixel is not on an edge portion.

20. An image data processor according to claim 19, wherein said saturation decision means comprising filtering means for smoothing the three primary color data received by said receive means, wherein the saturation of each pixels is decided according to the three primary color data subjected to the smoothing processing by said filtering means.

21. An image data processor, comprising:
receive means for receiving three primary color data for a plurality of pixels comprising an image;
edge detection means for detecting if each pixel is at a edge portion according to the three primary color data received by said receive means and for detecting a gradient direction at the edge for each of the three primary color data; and
edge emphasis means for emphasizing the edge for a pixel which is detected by said edge detection means to be located at an edge portion only when the gradient directions at the edge for the three primary colors agree with each other.

22. An image data processor according to claim 21, wherein said edge detection means detects a pixel at an edge portion for two directions perpendicular to each other.

23. An image data processor according to claim 21, wherein the three primary color data received by the receive means are electric signals representing the three primary color data.

24. An image data processor, comprising:
receive means for receiving three primary color data for a plurality of pixels comprising an image;
edge detection means for detecting a pixel at an edge portion according to the three primary color data received by said receive means and for detecting an edge detection quantity and a gradient direction of the edge for each of the three primary color data; and
data correction means for comparing the edge detection quantity with a first threshold value and with a second threshold value smaller than the first threshold value only when the gradient directions at the edge portion for the three primary color data agree with each other, for performing edge emphasis processing when the edge detection quantity is larger than the first threshold value and for performing smoothing processing when the edge detection quantity is smaller than the second threshold value.

25. An image data processor according to claim 24, wherein said edge detection means detects an edge detection quantity and the sign of the gradient at the edge portion for two directions perpendicular to each other.

26. An image data processor according to claim 24, wherein said data correction means performs the edge emphasis and the smoothing processing with use of a two-dimensional spatial filter.

27. An image processing method, comprising the steps of:

receiving three primary color data for a plurality of pixels;

detecting saturation of each pixel;

detecting if each pixel is at an edge portion or at a flat portion;

increasing an under color remove ratio for the three primary color data and performing smoothing processing if the pixel is at a flat portion and the saturation of the pixel is low;

decreasing the under color remove ratio for the three primary color data and performing smoothing processing if the pixel is at the flat portion and the saturation of the pixel is high; and decreasing the under color remove ratio for the three primary color data and performing edge emphasis if the pixel is at an edge portion.

* * * * *